US 7,514,807 B2

(12) United States Patent
Donnelly et al.

(10) Patent No.: US 7,514,807 B2
(45) Date of Patent: Apr. 7, 2009

(54) ALTERNATOR BOOST METHOD

(75) Inventors: Frank Donnelly, North Vancouver (CA); Andrew Tarnow, Cambridge Springs, PA (US)

(73) Assignee: Railpower Technologies Corp., Brossard (Quebec) (CA)

( * ) Notice: Subject to any disclaimer, the term of this patent is extended or adjusted under 35 U.S.C. 154(b) by 173 days.

(21) Appl. No.: 11/411,987

(22) Filed: Apr. 25, 2006

(65) Prior Publication Data

US 2006/0266044 A1    Nov. 30, 2006

Related U.S. Application Data

(60) Provisional application No. 60/674,837, filed on Apr. 25, 2005, provisional application No. 60/692,400, filed on Jun. 20, 2005, provisional application No. 60/753,444, filed on Dec. 22, 2005.

(51) Int. Cl.
    H02P 9/10    (2006.01)
(52) U.S. Cl. .................................. 290/40 C; 322/48
(58) Field of Classification Search ............... 280/40 C
    See application file for complete search history.

(56) References Cited

U.S. PATENT DOCUMENTS

| 384,580 | A | | 6/1888 | Julien |
| 744,187 | A | | 11/1903 | Gibbs |
| 1,199,752 | A | | 10/1916 | Baker |
| 1,377,087 | A | | 5/1921 | Manns |
| 1,535,175 | A | | 4/1925 | Mancha |
| 1,978,080 | A | * | 10/1934 | Giger ................... 105/49 |
| 2,403,933 | A | | 4/1946 | Lillquist |
| 2,472,924 | A | | 6/1949 | Schwendner |
| 2,510,753 | A | | 6/1950 | Multhaup |
| 2,704,813 | A | | 3/1955 | Stamm |
| 3,169,733 | A | | 2/1965 | Barrett, Jr. |
| 3,443,115 | A | | 5/1969 | Timmerman, Jr. |
| 3,569,810 | A | | 3/1971 | Thiele |
| 3,596,154 | A | | 7/1971 | Gurwicz et al. |
| 3,668,418 | A | | 6/1972 | Godard |
| 3,728,596 | A | | 4/1973 | Hermansson et al. |
| 3,737,745 | A | | 6/1973 | Chevaugeon et al. |

(Continued)

FOREIGN PATENT DOCUMENTS

CA    1283472    10/1987

(Continued)

OTHER PUBLICATIONS

U.S. Appl. No. 11/131,917, Donnelly.

(Continued)

Primary Examiner—Joseph Waks
(74) Attorney, Agent, or Firm—Merchant & Gould P.C.

(57) ABSTRACT

A circuit for boosting the voltage output of an alternator utilizes the armature coils of the alternator as part of the boost circuit. The circuit and methods utilizing this circuit can enable refined control strategies for operating a plurality of engine systems during propulsion, idling and braking and is applicable to large systems such as trucks, ships, cranes and locomotives utilizing diesel engines, gas turbine engines, other types of internal combustion engines, fuel cells or combinations of these that require substantial power and low emissions utilizing multiple power plant combinations.

10 Claims, 23 Drawing Sheets

U.S. PATENT DOCUMENTS

| | | | |
|---|---|---|---|
| 3,792,327 A | 2/1974 | Waldorf | |
| 3,832,625 A | 8/1974 | Gyugyi | |
| 3,898,937 A | 8/1975 | Johnson | |
| 3,919,948 A | 11/1975 | Kademann | |
| 3,930,189 A | 12/1975 | Smith | |
| 3,970,160 A | 7/1976 | Nowick | |
| 3,982,164 A | 9/1976 | de Buhr | |
| 3,997,822 A | 12/1976 | Logston et al. | |
| 4,012,680 A * | 3/1977 | Dickerson et al. | 388/806 |
| 4,035,698 A | 7/1977 | Soderberg | |
| 4,070,562 A | 1/1978 | Kuno et al. | |
| 4,075,538 A | 2/1978 | Plunkett | |
| 4,090,577 A | 5/1978 | Moore | |
| 4,095,147 A | 6/1978 | Mountz | |
| 4,096,423 A | 6/1978 | Bailey et al. | |
| 4,107,402 A | 8/1978 | Dougherty et al. | |
| 4,152,758 A | 5/1979 | Bailey et al. | |
| 4,199,037 A | 4/1980 | White | |
| 4,204,143 A | 5/1980 | Coleman | |
| 4,217,527 A | 8/1980 | Bourke et al. | |
| 4,284,936 A | 8/1981 | Bailey et al. | |
| 4,309,645 A | 1/1982 | De Villeneuve | |
| 4,344,139 A | 8/1982 | Miller et al. | |
| 4,347,569 A | 8/1982 | Allen, Jr. et al. | |
| 4,369,397 A | 1/1983 | Read | |
| 4,417,194 A | 11/1983 | Curtiss et al. | |
| 4,423,362 A | 12/1983 | Konrad et al. | |
| 4,471,276 A | 9/1984 | Cudlitz | |
| 4,471,421 A | 9/1984 | Brown et al. | |
| 4,495,449 A | 1/1985 | Black et al. | |
| 4,498,016 A | 2/1985 | Earleson et al. | |
| 4,513,361 A * | 4/1985 | Rensink | 363/21.04 |
| 4,523,134 A | 6/1985 | Kinoshita et al. | |
| 4,644,232 A | 2/1987 | Nojiri et al. | |
| 4,700,283 A | 10/1987 | Tsutsui et al. | |
| 4,701,682 A | 10/1987 | Hirotsu et al. | |
| 4,719,861 A | 1/1988 | Savage et al. | |
| 4,799,161 A | 1/1989 | Hirotsu et al. | |
| 4,896,090 A | 1/1990 | Balch et al. | |
| 4,900,944 A | 2/1990 | Donnelly | |
| 4,936,610 A | 6/1990 | Kumar et al. | |
| 4,941,099 A | 7/1990 | Wood et al. | |
| 4,944,539 A | 7/1990 | Kumar et al. | |
| 4,950,964 A | 8/1990 | Evans | |
| 4,961,151 A | 10/1990 | Early et al. | |
| 5,129,328 A | 7/1992 | Donnelly | |
| 5,212,431 A | 5/1993 | Origuchi et al. | |
| 5,264,764 A | 11/1993 | Kuang | |
| 5,281,900 A | 1/1994 | Park | |
| 5,289,093 A | 2/1994 | Jobard | |
| 5,306,972 A | 4/1994 | Hokanson et al. | |
| 5,317,669 A | 5/1994 | Anderson et al. | |
| 5,331,261 A | 7/1994 | Brown et al. | |
| 5,332,630 A | 7/1994 | Hsu | |
| 5,343,970 A | 9/1994 | Severinsky | |
| 5,359,228 A | 10/1994 | Yoshida | |
| 5,376,868 A | 12/1994 | Toyoda et al. | |
| 5,392,716 A | 2/1995 | Orschek et al. | |
| 5,424,948 A | 6/1995 | Jorday, Jr. | |
| 5,428,538 A | 6/1995 | Ferri | |
| 5,436,538 A | 7/1995 | Garvey et al. | |
| 5,436,540 A | 7/1995 | Kumar | |
| 5,436,548 A | 7/1995 | Thomas | |
| 5,453,672 A | 9/1995 | Avitan | |
| 5,480,220 A | 1/1996 | Kumar | |
| 5,508,924 A | 4/1996 | Yamashita | |
| 5,510,203 A | 4/1996 | Hamada et al. | |
| 5,510,693 A | 4/1996 | Theobald | |
| 5,511,749 A | 4/1996 | Horst et al. | |
| 5,528,148 A | 6/1996 | Rogers | |
| 5,564,795 A | 10/1996 | Engle | |
| 5,568,023 A | 10/1996 | Grayer et al. | |
| 5,580,677 A | 12/1996 | Morishita et al. | |
| 5,580,685 A | 12/1996 | Shenk et al. | |
| 5,585,706 A | 12/1996 | Avitan | |
| 5,589,743 A | 12/1996 | King | |
| 5,610,499 A | 3/1997 | Rogers | |
| 5,610,819 A | 3/1997 | Mann et al. | |
| 5,616,056 A * | 4/1997 | Meissner | 440/3 |
| 5,629,567 A | 5/1997 | Kumar | |
| 5,629,596 A | 5/1997 | Iijima et al. | |
| 5,629,601 A | 5/1997 | Feldstein | |
| 5,631,532 A | 5/1997 | Azuma et al. | |
| 5,646,510 A | 7/1997 | Kumar | |
| 5,659,240 A | 8/1997 | King | |
| 5,661,378 A | 8/1997 | Hapeman | |
| 5,677,610 A | 10/1997 | Tanamachi et al. | |
| 5,685,507 A | 11/1997 | Horst et al. | |
| 5,696,438 A | 12/1997 | Hamilton | |
| 5,698,905 A * | 12/1997 | Ruthlein et al. | 290/32 |
| 5,698,955 A | 12/1997 | Nii | |
| 5,710,699 A | 1/1998 | King et al. | |
| 5,735,215 A | 4/1998 | Tegeler | |
| 5,751,137 A | 5/1998 | Kiuchi et al. | |
| 5,765,656 A | 6/1998 | Weaver | |
| 5,793,625 A * | 8/1998 | Balogh | 363/89 |
| 5,820,172 A | 10/1998 | Brigham et al. | |
| 5,856,037 A | 1/1999 | Casale et al. | |
| 5,898,281 A | 4/1999 | Bossoney et al. | |
| 5,898,282 A | 4/1999 | Drozdz et al. | |
| 5,915,488 A * | 6/1999 | Fliege | 180/65.2 |
| 5,939,861 A | 8/1999 | Joko et al. | |
| 5,942,818 A * | 8/1999 | Satoh et al. | 310/46 |
| 5,964,309 A | 10/1999 | Kimura et al. | |
| 5,992,950 A | 11/1999 | Kumar et al. | |
| 5,998,880 A | 12/1999 | Kumar | |
| 6,012,011 A | 1/2000 | Johnson | |
| 6,021,251 A | 2/2000 | Hammer et al. | |
| 6,023,137 A | 2/2000 | Kumar et al. | |
| 6,025,086 A | 2/2000 | Ching | |
| 6,027,181 A | 2/2000 | Lewis et al. | |
| 6,082,834 A | 7/2000 | Kolbe et al. | |
| 6,104,148 A | 8/2000 | Kumar et al. | |
| 6,175,272 B1 | 1/2001 | Takita | |
| 6,208,097 B1 | 3/2001 | Reddy et al. | |
| 6,211,646 B1 | 4/2001 | Kouzu et al. | |
| 6,218,807 B1 | 4/2001 | Sakaue et al. | |
| 6,274,998 B1 | 8/2001 | Kaneko et al. | |
| 6,297,978 B1 * | 10/2001 | Cronmiller et al. | 363/67 |
| 6,308,639 B1 | 10/2001 | Donnelly et al. | |
| 6,331,365 B1 | 12/2001 | King | |
| 6,359,346 B1 | 3/2002 | Kumar | |
| 6,367,891 B1 | 4/2002 | Smith et al. | |
| 6,371,573 B1 | 4/2002 | Goebels et al. | |
| 6,384,489 B1 | 5/2002 | Bluemel et al. | |
| 6,405,705 B1 | 6/2002 | Dunsworth et al. | |
| 6,408,766 B1 | 6/2002 | McLaughlin et al. | |
| 6,417,646 B1 | 7/2002 | Huykman et al. | |
| 6,421,618 B1 | 7/2002 | Kliman et al. | |
| 6,441,581 B1 | 8/2002 | King et al. | |
| 6,449,536 B1 | 9/2002 | Brousseau et al. | |
| 6,456,674 B1 | 9/2002 | Horst et al. | |
| 6,456,908 B1 | 9/2002 | Kumar | |
| D464,622 S | 10/2002 | Donnelly | |
| 6,470,245 B1 | 10/2002 | Proulx | |
| 6,486,568 B1 | 11/2002 | King et al. | |
| 6,497,182 B2 | 12/2002 | Melpolder et al. | |
| 6,507,506 B1 | 1/2003 | Piñas et al. | |
| 6,532,405 B1 | 3/2003 | Kumar et al. | |
| 6,537,694 B1 | 3/2003 | Sagiura et al. | |
| 6,564,172 B1 | 5/2003 | Till | |
| 6,581,464 B1 | 6/2003 | Anderson et al. | |
| 6,591,758 B2 | 7/2003 | Kumar | |
| 6,608,396 B2 | 8/2003 | Downer et al. | |

| | | |
|---|---|---|
| 6,611,116 B2 | 8/2003 | Bachman et al. |
| 6,612,245 B2 | 9/2003 | Kumar et al. |
| 6,612,246 B2 | 9/2003 | Kumar |
| 6,615,118 B2 | 9/2003 | Kumar |
| 6,618,662 B2 | 9/2003 | Schmitt et al. |
| 6,627,345 B1 | 9/2003 | Zemlok et al. |
| 6,634,303 B1 | 10/2003 | Madsen et al. |
| 6,653,002 B1 | 11/2003 | Parise |
| 6,658,331 B2 | 12/2003 | Horst et al. |
| 6,678,972 B2 | 1/2004 | Naruse et al. |
| 6,688,481 B1 | 2/2004 | Adner et al. |
| 6,691,005 B2 | 2/2004 | Proulx |
| 6,697,716 B2 | 2/2004 | Horst |
| 6,713,990 B1 * | 3/2004 | Giraud et al. ............... 322/23 |
| 6,725,134 B2 | 4/2004 | Dillen et al. |
| 6,728,606 B2 | 4/2004 | Kumar |
| 6,737,822 B2 | 5/2004 | King |
| 6,765,315 B2 | 7/2004 | Hammerstrom et al. |
| 6,812,656 B2 | 11/2004 | Donnelly et al. |
| 6,823,835 B2 | 11/2004 | Dunsworth et al. |
| 6,829,529 B2 | 12/2004 | Trefzer et al. |
| 6,829,556 B2 | 12/2004 | Kumar |
| 6,879,054 B2 | 4/2005 | Gosselin |
| 6,885,920 B2 | 4/2005 | Yakes et al. |
| 6,909,200 B2 | 6/2005 | Bouchon |
| 6,909,201 B2 | 6/2005 | Murty et al. |
| 6,909,959 B2 | 6/2005 | Hallowell |
| 6,924,629 B1 * | 8/2005 | Mueller et al. ............... 322/28 |
| 6,941,218 B2 | 9/2005 | Wolf et al. |
| 6,973,880 B2 | 12/2005 | Kumar |
| 7,012,822 B2 * | 3/2006 | Zhu et al. .................. 363/70 |
| 7,100,717 B2 * | 9/2006 | Stancu et al. ............. 180/65.1 |
| 7,102,313 B2 | 9/2006 | Kadota et al. |
| 2002/0190525 A1 | 12/2002 | Worden et al. |
| 2003/0150352 A1 | 8/2003 | Kumar |
| 2003/0151387 A1 | 8/2003 | Kumar |
| 2003/0233959 A1 | 12/2003 | Kumar |
| 2004/0133315 A1 | 7/2004 | Kumar et al. |
| 2005/0024001 A1 | 2/2005 | Donnelly et al. |
| 2005/0045058 A1 | 3/2005 | Donnelly et al. |
| 2005/0189886 A1 | 9/2005 | Donnelly |
| 2005/0189887 A1 | 9/2005 | Donnelly et al. |
| 2005/0206230 A1 | 9/2005 | Donnelly |
| 2005/0206331 A1 | 9/2005 | Donnelly |
| 2005/0251299 A1 | 11/2005 | Donnelly |
| 2005/0279242 A1 | 12/2005 | Maier |
| 2005/0279243 A1 | 12/2005 | Bendig et al. |
| 2006/0001399 A1 | 1/2006 | Salasoo et al. |
| 2006/0061307 A1 | 3/2006 | Donnelly |
| 2006/0076171 A1 | 4/2006 | Donnelly et al. |

FOREIGN PATENT DOCUMENTS

| | | |
|---|---|---|
| CA | 2411132 | 11/2002 |
| EP | 0 348 938 | 1/1990 |
| GB | 873167 | 3/1960 |
| GB | 1129709 | 11/1966 |
| GB | 1 312 699 | 10/1970 |
| GB | 2 005 205 A | 9/1977 |
| WO | WO 03/072388 | 9/2003 |
| WO | WO 2004/042890 | 5/2004 |
| WO | WO 2005/030550 | 4/2005 |
| WO | WO 2005/079504 | 9/2005 |
| WO | WO 2005/084335 | 9/2005 |
| WO | WO 2005/086910 | 9/2005 |
| WO | WO 2005/097573 | 10/2005 |
| WO | WO 2005/114811 | 12/2005 |
| WO | WO 2006/020587 | 2/2006 |
| WO | WO 2006/020667 | 2/2006 |
| WO | WO 2006011359 A1 * | 2/2006 |

OTHER PUBLICATIONS

U.S. Appl. No. 11/143,252, Donnelly.

Supplemental Declaration of Frank Donnelly Under 37 CFR § 1.98; dated Jan. 25, 2007 for U.S. Appl. No. 11/143,252, 6 pages.

Perreault et al., *A New Design for Automotive Alternators*, Massachusetts Institute of Technology, 2000.

L.M. Lorilla, *Enhanced Next Generation Alternator*, Massachusetts Institute of Technology, 2005, Figure 2.6 and accompanying description.

"Comparative Economic Assessment of a Natural Gas Fueled Locomotive with On-Board CNG Storage to Diesel and LNG Variants", Donnelly et al, IEEE/ASME Joint Railroad Conference, Baltimore, Apr. 1995, 30 pages.

Design of Switched Reluctance Motors and Development of a Universal Controller for Switched Reluctance and Permanent Magnet Brushless DC Motors, Phd Dissertation, Virginia Polytechnic Institute and State University, Prahveen Vijayraghavan, Blacksburg, VA, Nov. 2001, 215 pages.

"Development of a New Battery System for Hybrid Vehicle", Tomokazu Yamauchi et al, Toyota, presented at the EVS 17 in Montreal, Oct. 2000, 7 pages.

"Improving the Valve-Regulated Lead Acid Battery", P.T. Moseley, Journal of Power Sources 88 (2000) 71-77.

"Keeping Up the Pressure-Strategies to Maintain Plate-Group Pressure and Extend the Cycle Life of VRLA Batteries", M.J. Weighall, Journal of Power Sources 95 (2001) 209-217.

"Lead-Acid Battery State of Charge vs. Voltage", Richard Perez, Home Power #36, Aug./Sep. 1993, 5 pages.

"Li-Ion Battery-Powered Buck-Boost Regulator Minimizes Portable Product Size", Chen IIC-China/ESC-China Conference Proceedings, 2002, 5 pages.

"Linear/Switchmode Voltage Regulator Handbook" Motorola, Inc. 1982, 3 pages.

"LNG as a Fuel for Railroads: Assessment of Technology Status and Economics", Pera and Moyer, Acurex Corporation, 1993, Gas Research Institute contract No. 5091-292-2153, 122 pages.

"Locomotive Energy Storage System," Advanced Railway Technology, Inc. (Dec. 1985), 22 pages.

"Motor Control Electronics Handbook" edited by Richard Valentine, McGraw Hill 1998, ISBN 0-07-066810-8, p. 161-221.

"Performance and Control of the Switched Reluctance Motor", Dahdah et al, University of Western Sydney, Australia, 4 pages.

"Progress in Overcoming the Failure Modes Peculiar to VRLA Batteries", A. Cooper, P.T. Moseley, Journal of Power Sources 113 (2003) 200-208.

"Research Results from the Advanced Lead-Acid Battery Consortium Point the Way to Longer Life and Higher Specific Energy for Lead/Acid Electric-vehicle Batteries", P.T. Moseley, Journal of Power Sources 73 (1998) 122-126.

"Supercapacitive Energy Storage for Diesel-Electric Locomotives", Destraz, Barrade and Rufer, Swiss Federal Institute of Technology, paper presented at SPEEDAM 2004, Jun. 16, Capri, Italy, 6 pages.

"The Control of Switched Reluctance Drives and their Use for Flywheel Energy Storage", Brabandere et al., 5 pages.

"The Car and Locomotive Encyclopedia" by Kalmbach Publishing Company, Model Railroader (1980), 3 pages.

"Thermal Evaluation of the Honda Insight Battery Pack" M.D. Zolot et. al. National Renewable Energy Laboratory, Presented at the 36th Intersociety Energy Conversion Engineering Conference, Savannah Georgia, Jul. 29 to Aug. 2, 2001, 9 pages.

"VRLA Traction", Proceedings of the First International Symposium on the Use of VRLA Batteries in Traction Application, Honolulu, Jun. 2005.

Berg, "Concept Truck Addresses Future Clean Air Demands With Hybrid Turbine-Electric Powertrain," *Emissions Alternatives Fuels* (date unknown), pp. 55-57.

C.E. Band et al., "Development of and Operational Experience with a High Powered D.C. Chopper for 1500 Volt D.C. Railway Equipment," Institution of Electrical Engineers Conference Publication 53 on Power Thyristors and Their Applications, Part 1 (May 1969), 1-page.

Declaration of Ronald Bailey under 37 CFR § 1.98 dated Dec. 3, 2004 for U.S. Appl. No. 10/650,011, 3 pages.

Declaration of Frank Donnelly Under 37 CFR § 1.98, 5 pages.

FMTV—with HybriDrive Propulsion System, pp. 1-3.

Hassan Moghbelli et al., "Chopper Design for NICTD Locomotives," Proceedings of the 1993 IEEE/ASME Joint Railroad Conference, Apr. 1993, pp. 67-75.

Joseph Szymborski et al., "Examination of VRLA Battery Cells Sampled from the Metlakatla Battery Energy Storage System", 15 pages.

Kostic et al., "An Analytic Solution of the Choppers Ripple Currents," Proceedings of the 1993 IEEE/ASME Joint Railroad Conference, Apr. 1993, pp. 103-107.

M.J. Hapeman et al., "Diesel Electric Locomotive Propulsion Systems—A Look into the Future," IEEE Technical Papers Presented at the 1985 Joint ASME/IEEE Railroad Conference, New York City, NY, Apr. 16-18, 1985, pp. 108-115.

Mendler, "The Technological Opportunities of Hybrid Electric Vehicles," Society of Automotive Engineers, Inc. (1996), pp. 1-16.

Mercer, "Innovative Use of Horsepower—Hybrid Bus Powered by Gas Turbine," *Diesel Progress* (Dec. 1997), pp. 56-57.

Nene, "Advanced Propulsion Systems for Urban Rail Vehicles: Chapter 2: DC Drives with a Chopper Controller," Prentice-Hall, Inc. (1985), pp. 18-45.

Press Release: "French Railway Company Voies Ferees Legeres et Industielles (VFLI) Puts Its Trust in Deutch Engines", Jun. 2003, 2 pages.

Thompson, "Electric Transportation," International Textbook Co., Scranton, Pa; (1$^{st}$ Ed., 1940), pp. 254-262.

Perreault, David J. et al., "A New Design for Automotive Alternators", Massachusetts Institute of Technology, 2000, 12 pages.

Railway Age, "Switchers, the Gen-Set generation", Simmons-Boardman Publishing Corporation, vol. 207 No. 3, copyright 2006, 1 page.

* cited by examiner

ALTERNATOR BOOST METHOD

CROSS REFERENCE TO RELATED APPLICATION

The present application claims the benefits, under 35 U.S.C. § 119(e), of U.S. Provisional Application Ser. Nos. (a) 60/674,837, filed Apr. 25, 2005, entitled "Multiple Engine Locomotive Control"; (b) 60/692,400, filed Jun. 20, 2005, entitled "Multiple Engine Locomotive Control"; and (c) 60/753,444, filed Dec. 22, 2005, entitled "Alternator Voltage Boost Method"; all to Donnelly, et al. and each of which is incorporated herein by this reference.

FIELD

The present invention relates generally to means of boosting the voltage output of an alternator utilizing the armature coils of the alternator as part of the boost circuit.

BACKGROUND

Railroads are under increasing pressure to reduce emissions and to increase fuel efficiency. One of several responses to these forces has been the development of hybrid locomotives. Donnelly has disclosed the use of a battery-dominant hybrid locomotive in U.S. Pat. No. 6,308,639 which is incorporated herein by reference. Hybrid locomotives can reduce emissions and fuel consumption in rail operations such as yard switching but they are less effective for medium haul freight or commuter trains.

In U.S. patent application Ser. No. 11/200,88 filed Aug. 19, 2005 entitled "Locomotive Power Train Architecture", Donnelly et al. have further disclosed a general electrical architecture for locomotives based on plurality of power sources, fuel and drive train combinations. The power sources may be any combination of engines, fuel cells, energy storage and regenerative braking. This application is also incorporated herein by reference.

Multi-engine locomotives are not new and a number of configurations have been built over the years. Examples are the Baldwin locomotives built in the 1940s and, more recently, a dual engine locomotive built by the French Railway Company, VFLI. In U.S. patent application Ser. No. 11/201,267 filed Aug. 9, 2005 entitled "Multiple Engine Locomotive Configuration", Donnelly et al. have disclosed a means of packaging engine modules on a multi-engine locomotive that optimizes the power density of the locomotive power plants while reducing emissions and fuel consumption.

In yard switching operations, for example, the engine or engines on a hybrid or multi-engine locomotive may be required to operate at low track speeds at either low or moderate output power for extended periods of time. Concurrently, the locomotive may also be required to provide its power at a reasonably high alternator output voltage level. This can be accomplished by operating the engine or engines at high rpm but at decreased fuel efficiency corresponding to a low output power level. At engine speeds below the normal operating range, output voltage from the alternator can be maintained by increasing the excitation to the alternator. However, at very low engine speeds, excitation cannot be increased without limit to maintain a high alternator output voltage and therefore the required output voltage cannot be maintained.

There thus remains a need for an alternator configuration that can operate at low engine speeds while continuing to provide a sufficiently high output voltage required by the traction motors and auxiliary power systems. This capability is preferred for more versatile hybrid and/or multi-engine control strategies that may require engines to operate over a wide range of rpms while providing electrical output at a sufficiently high voltage level to a common DC electrical bus.

SUMMARY

These and other needs are addressed by the various embodiments and configurations of the present invention which are directed generally to means of boosting the voltage output of an alternator utilizing the armature coils of the alternator as part of the boost circuit. The inventions disclosed herein are applicable to controlling the individual prime power systems of a multi-prime power locomotives utilizing prime power sources such as diesel engines, gas turbine engines, fuel cells, other types of internal combustion engines or combinations of these. The inventions may also apply to other types of vehicles or systems that require substantial power and low emissions utilizing multiple power plant combinations. Examples of other vehicles and systems include large trucks such as mining trucks, tugboats and large mobile cranes.

In particular, the objective of the present invention is to disclose a method for boosting the voltage output of an alternator utilizing the armature coils of the alternator as part of the boost circuit.

In a preferred embodiment, a propulsion system is provided that includes:

(a) an engine system comprising;
an engine; and
an n-phase alternator operable to convert mechanical energy output by the engine into alternating current electrical energy, with each phase corresponding to an armature winding;

(b) one or more traction motors in electrical communication with the alternator;

(c) a voltage boost circuit electrically connected with each of the n-armature windings of the alternator to boost the output voltage associated with each armature winding. Each armature winding provides an inductance for the voltage boost circuit.

This embodiment can provide an alternator/rectifier with output voltage boost control suitable for maintaining a high level of output voltage to a load such as a DC bus even at low alternator rpms. In one configuration, the voltage boost capability for a 3-phase alternator is provided by a single IGBT, a single capacitor and 3 additional power diodes added to the circuit of a conventional alternator/rectifier to accomplish independent voltage output control for variable alternator rotor speeds. The amount of output voltage boost is controlled by the duty cycle of the IGBT. Each armature coil of the alternator serves as the voltage source and energy storage inductor in a voltage boost circuit.

The alternator voltage boost, if used, can allow an engine to operate at low speed while providing power at optimum or near-optimum fuel efficiency and while independently maintaining the output voltage of the alternator/rectifier at a required level. This is a significant advantage for hybrid and/or multiple-engine power systems where the voltage level of a common DC bus must be maintained within a predetermined voltage range while the vehicle is being operated over a wide range of travel speeds.

As shown, the present invention can permit the additional control of a multi-engine locomotive, especially when operating one or more of the engines at a low rpm or in idle mode.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

The following definitions are used herein:

A locomotive is generally a self-propelled railroad prime mover which is powered either by a steam engine, diesel engine or externally such as from an overhead electrical catenary or an electrical third rail.

An engine refers to any device that uses energy to develop mechanical power, such as motion in some other machine. Examples are diesel engines, gas turbine engines, microturbines, Stirling engines and spark ignition engines A prime power source refers to any device that uses energy to develop mechanical or electrical power, such as motion in some other machine. Examples are diesel engines, gas turbine engines, microturbines, Stirling engines, spark ignition engines or fuel cells.

A motor refers to a device that produces or imparts motion.

A traction motor is a motor used primarily for propulsion such as commonly used in a locomotive. Examples are an AC or DC induction motor, a permanent magnet motor and a switched reluctance motor.

An energy storage system refers to any apparatus that acquires, stores and distributes mechanical or electrical energy which is produced from another energy source such as a prime energy source, a regenerative braking system, a third rail and a catenary and any external source of electrical energy. Examples are a battery pack, a bank of capacitors, a compressed air storage system and a bank of flywheels.

An electrical energy converter refers to an apparatus that transmits or blocks the flow of electrical energy and may also increase or reduce voltage and change the frequency of the transmitted energy including changing the frequency to zero. Examples but are not limited to an inverter, a rectifier circuit, a chopper circuit, a controlled rectifier such as a cycle converter, a boost circuit, a buck circuit and a buck/boost circuit.

A mechanical-to-electrical energy conversion device refers an apparatus that converts mechanical energy to electrical energy. Examples include but are not limited to a synchronous alternator such as a wound rotor alternator or a permanent magnet machine, an asynchronous alternator such as an induction alternator, a DC generator, and a switched reluctance generator.

Dynamic braking is implemented when the electric propulsion motors are switched to generator mode during braking to augment the braking force. The electrical energy generated is typically dissipated in a resistance grid system.

Regenerative braking is the same as dynamic braking except the electrical energy generated is recaptured and stored in an energy storage system for future use.

Engine speed is the rotary speed of the engine output drive shaft and is typically expressed in rpms.

Alternator speed is the rotary speed of the alternator rotor and is typically expressed in rpms. The alternator speed is commonly the same as engine speed since they are usually directly connected with no intermediate gearing.

An IGBT is Insulated Gate Bipolar Transistor which is a power switching device capable of sequentially chopping a voltage waveform at a very fast rate.

The duty cycle of an IGBT is the ratio of time that the IGBT is switched on (conducting) to the total time that the IGBT is switched on (conducting) and off (non-conducting).

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The general control method of the present invention can be applied to a locomotive with multiple prime power sources. These can be internal combustion engines such as diesel engines for example, or fuel cells, or a combination of engines and fuel cells. The principal problem of control is (1) to accurately determine the power output of each prime power source to a common DC bus, most preferably by measuring the current output of each prime power system at the DC bus and then (2) to use this determination to modify the mechanical and/or electrical parameters of each prime power system to ensure that the power being supplied to the DC bus is provided at the selected operating conditions of each prime power system and in the selected amount from each prime power source. In much of the following detailed descriptions, the method is illustrated by multiple engine systems. As described near the end of the detailed descriptions, fuel cells may be used in place of or in combination with engines.

Multi-Engine System Control Architecture

Figure 1:
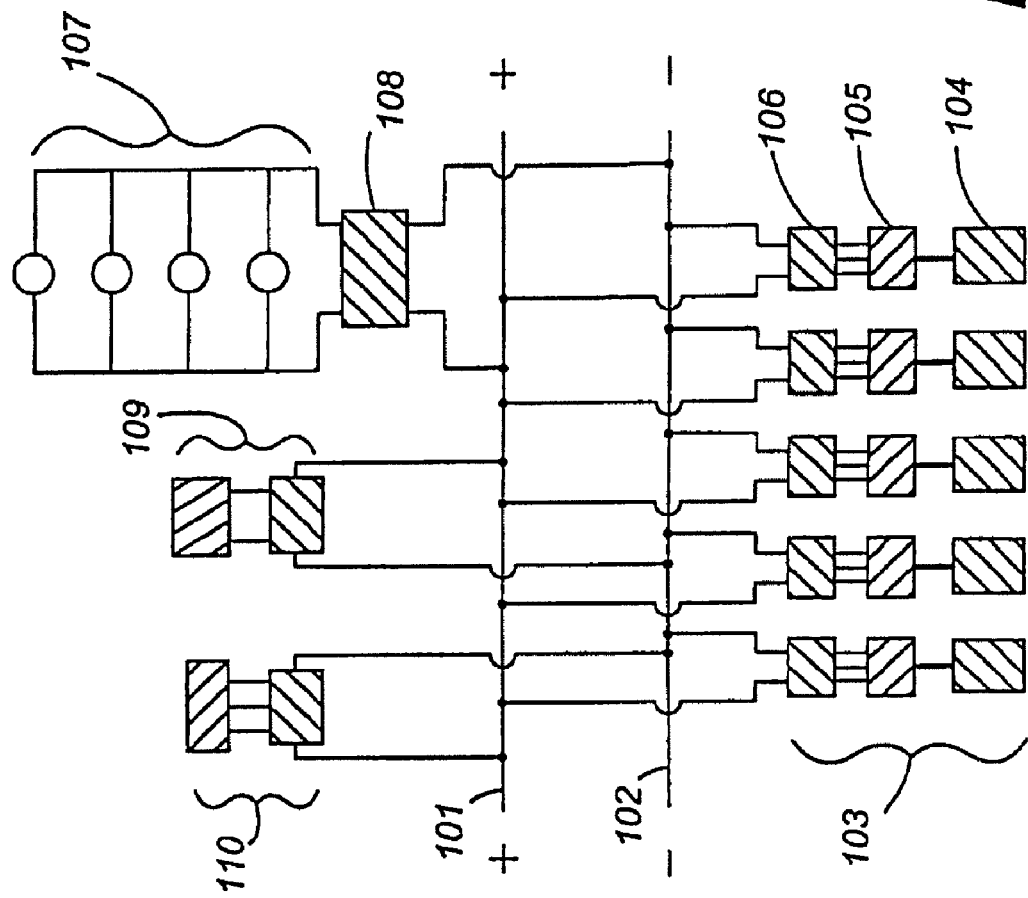
FIG. 1 is a schematic of the principal propulsion components of a locomotive with multiple prime power sources.

FIG. 1 is a schematic diagram showing an example of five engine systems 103 connected in parallel to a DC bus represented by bus bars 101 and 102 to provide power to four traction motors 107 controlled through a power control device 108. If the traction motors are AC motors, the power control device is an inverter. If the traction motors are DC motors, the power control device is a chopper. The same principles can be applied to any number of engines in the range of two engines to about eight engines. Eight engines could in principle correspond to the eight notches of power control typically used in many locomotives. This example illustrates how a number of smaller engines which may have highly developed efficiency and emission controls can be used in place of a single large engine. In this example, four traction motors are used but, as can be appreciated, the number and type of drive motors is independent of the number and type of power supplies. Each engine 104 is shown has its mechanical shaft power converted to DC electrical output by an alternator 105 whose AC output is converted to DC output by a rectifier 106 which, in turn, is connected to the DC bus. An engine system 103 is comprised of an engine 104, its corresponding alternator 105 and rectifier 106. The voltage levels and power outputs of the engine systems are controlled independently by their individual excitation means incorporated in their engine systems. The rectifiers are commonly comprised of blocking diodes to prevent reverse power flow from the DC bus when the DC output voltage of a particular engine system is less than the voltage across the DC bus. As can be seen, the voltage across the DC bus is established by the engine system or systems with the highest DC output voltage to the bus. Engine systems with lower output DC voltages than the voltage across the bus will not provide power to the bus and will not receive power from the bus because of the blocking diodes contained in their rectifiers. Thus, by controlling the output voltage of any engine system by its particular excitation means, that engine system can be brought on-line to supply power to the DC bus. In this example, the DC bus supplies power to a load control apparatus 108 which controls the level of power to all four traction motors 107. The bus provides a power capacity at a predetermined voltage and the load control apparatus 108 controls the current flow, and hence the power level, to the motors 107. The traction motors 107 may be, for example, AC induction motors, DC motors, permanent magnet motors or switched reluctance motors. If the traction motors are AC motors, power is controlled by means of one or more inverters connected to the DC bus. Alternately, if the traction motors are DC motors, power is controlled by means of one or more chopper circuits connected to the DC bus. In the example shown in FIG. 1, a single load control apparatus controls all of the traction motors Although not shown here, locomotives may be configured with each traction motor having its own load control apparatus.

A conventional battery operated starter motor can be used to start an engine. Alternately, a compressed air driven engine starter system may be utilized, making use of the compressed air supply associated with, for example, an air brake system. Alternately, the voltage control strategy articulated above is also compatible with the use of an induction alternator to provide electrical power from the engines to a DC bus. The use of an induction alternator, when at least one electrical power source is in operation supplying power to the DC bus, would allow power from the DC bus to be used to start or restart an engine that is turned off. This method of starting engines is known and is used to provide high starting power without the need of a separate starter motor. A pre-lubrication pump can also be operated directly from the DC bus or from an auxiliary power supply to lubricate a diesel engine just prior to starting it so as to extend its operational lifetime. While the above engine start-up procedures are well-known, they can be applied more readily utilizing the voltage control and DC bus architecture of the present invention.

Figure 2:
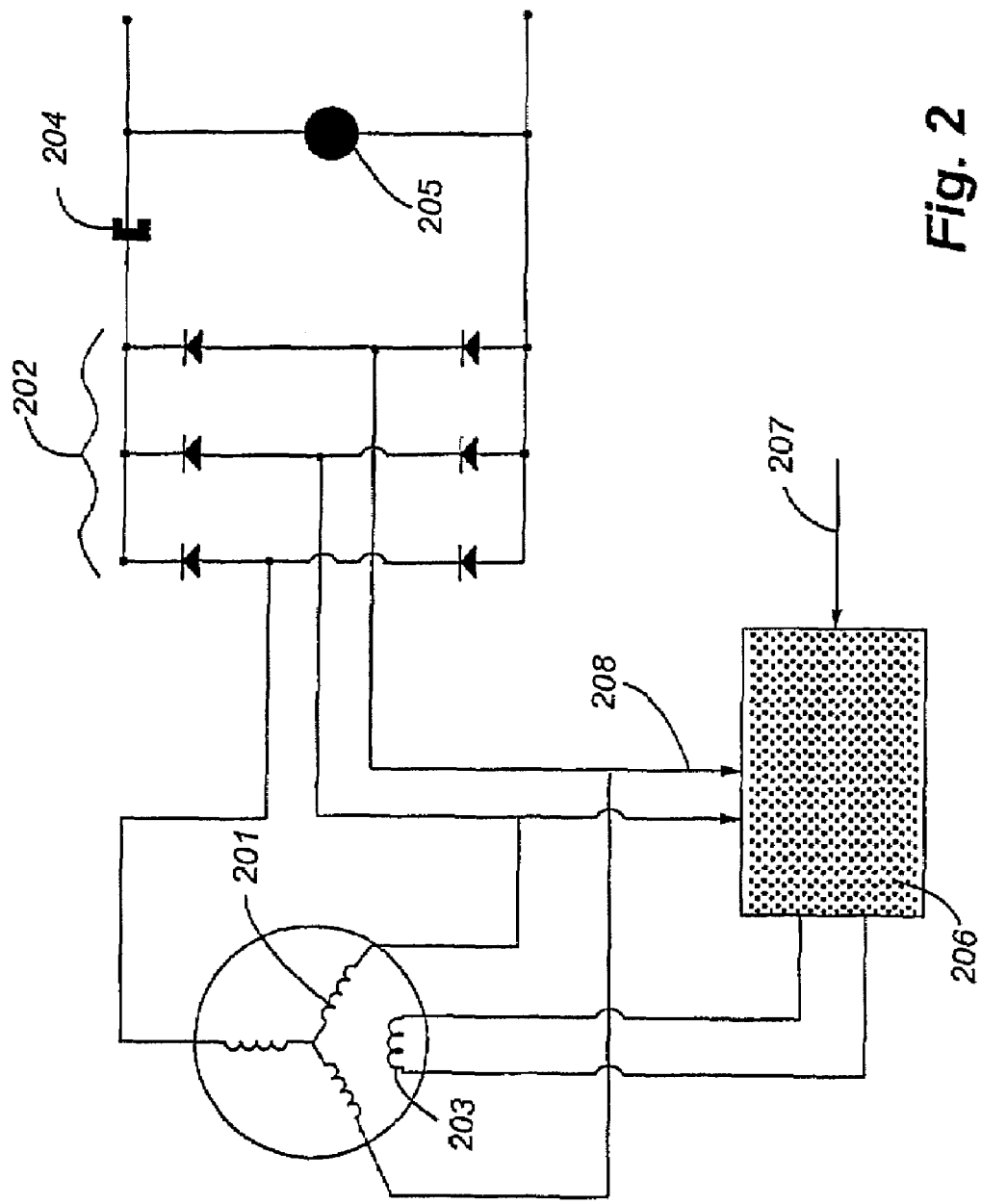
FIG. 2 is a schematic circuit of an alternator and rectifier circuit showing an example of an independently controlled exciter control system that is prior art.

FIG. 2 is a schematic circuit of an alternator and rectifier circuit showing an exciter control means that is prior art. Armature coils 201 generate an alternating current which is rectified by power diodes 202. If used in the present invention, the rectified power is then delivered to a DC bus which distributes the power as required to a propulsion system, auxiliary power systems, and in the case of a hybrid vehicle, to an energy storage system. The output of the armature coils 201 is regulated by an independently controlled exciter coil 203. The output power to the DC bus may be monitored by a current transducer 204 and a voltage sensor 205. An excitation control circuit 206 receives its inputs from a computer control system via path 207 or, in an emergency (such as from detection of an anomalously high voltage output from the generator, for example), from path 208 originating from the voltage sensed across the DC bus terminals. In the case of such an emergency, the excitation circuit 206 has the ability to override the control of the main logic controller and directly reduce the current to the excitation field coil 203.

Figure 3:
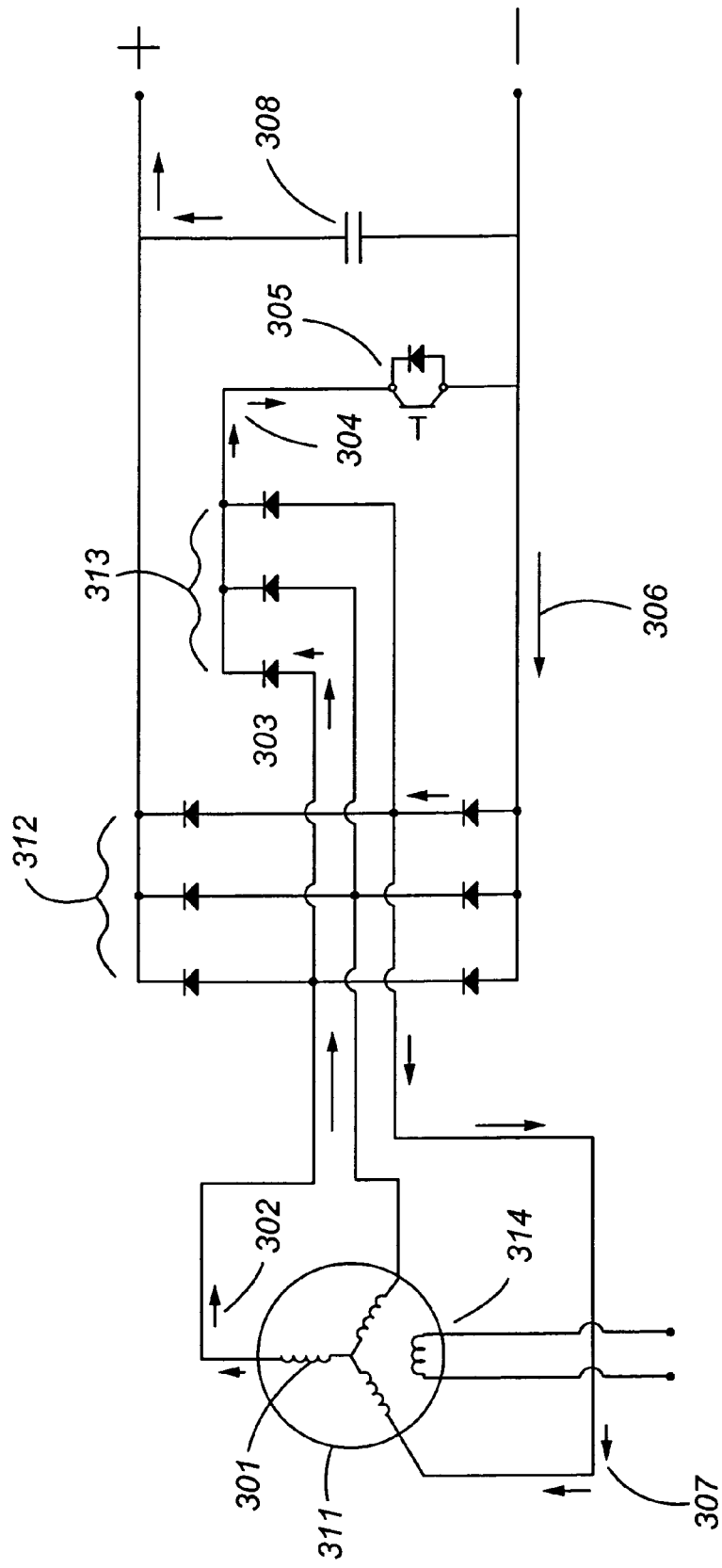
FIG. 3 is a schematic circuit of an alternator and rectifier circuit of the present invention showing a boost circuit with its IGBT in conducting mode.

FIG. 3 is a schematic circuit of an alternator and rectifier circuit of the present invention. The shaft power of a diesel, gas turbine or other type of engine turns an alternator rotor assembly 311 whose field coils cause armature coils 301 in the stator to generate an alternating current which is rectified by power diodes 312. The rectified power is then delivered to a load such as a DC bus. The output of the armature coils 301 is modulated by an independently controlled exciter coil 314. The circuit of FIG. 3 includes an additional set of three power diodes 313, an IGBT 305 and a capacitor 308 which together form a voltage boost circuit for each combination of the three armature coils 301. At any instant, a pair of armature coils 301 which are conducting current constitute a voltage source and an inductance in a voltage boost circuit which includes one of the three diodes 313, the IGBT 305 and capacitor 308.

In the examples used herein, the alternator is taken to be a 3-phase alternator and the engine output shaft is taken to be directly connected to the rotor of the alternator (so engine rpms and alternator rpms are the same in the examples discussed herein). As can be appreciated, the alternator can be a 2-phase or n-phase machine but is typically a 3-phase machine when used with large diesel engines such as used on diesel-electric locomotives, for example. As can also be appreciated, the engine output shaft can be geared up or down to couple with the alternator rotor. However, in most diesel-electric locomotives, the engine output shaft is directly connected to the rotor of the alternator.

When the engine is operating at high rpm, there is no need to boost the output voltage of the alternator/rectifier. However, when the engine is operating at low rpm, the exciter circuit cannot sufficiently compensate to provide the required level of output voltage. At low rpm, for example at 1,000 rpm (where the preferred operating rpm level of the alternator is in the range of about 1,700 to about 1,900 rpm), the output frequency of each armature coil is about 33 Hz. A power IGBT can operate at on/off frequencies of about 1,000 Hz and so can provide the requisite pumping action to boost the output voltage of each armature coil.

One of the principal features of the present invention is that the inductance of the alternator armature coils is in the correct range for effective voltage boost for the range of alternator operating frequencies and the available IGBT switching duty cycles.

FIG. 3 also shows the present invention acting as a boost circuit with its IGBT in conducting mode. In this example, armature coils 301 have a positive voltage and generate current 302 which is short circuited through diode 303 along path 304 by the conducting IGBT 305 and returns via path 306 and, in this example, through the armature coil that lags by 240 degrees via path 307. Thus, electrical energy is being stored in armature coils 301. Meanwhile, capacitor 308 is discharging through the output terminals to the load (not shown). Armature coils 301, diode 303, IGBT 305 and capacitor 308 form a voltage boost circuit. As the rotor turns, each pair of armature coils and a corresponding diode form a voltage boost circuit with IGBT 305 and capacitor 308. In this way, the net voltage output across the load terminals is increased over that of an alternator without the added circuitry of the present invention. A feature of the present invention is the requirement for only one additional IGBT to a prior art circuit.

Figure 4:
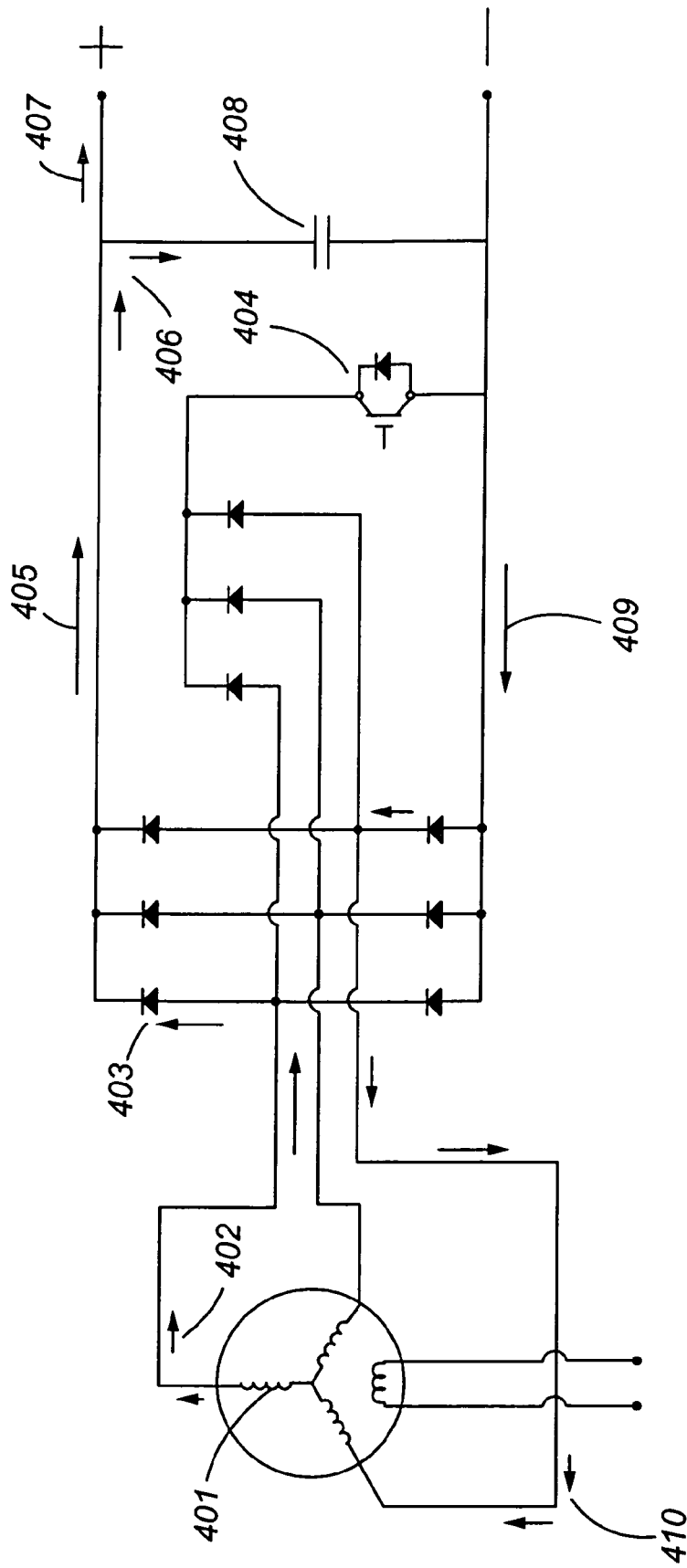
FIG. 4 is a schematic circuit of an alternator and rectifier circuit of the present invention showing a boost circuit with its IGBT in non-conducting mode.

FIG. 4 is a schematic circuit of an alternator and rectifier circuit of the present invention showing a boost circuit with its IGBT in non-conducting mode. In this example, which is similar to that of FIG. 3, armature coils 401 continue to have a positive voltage and to generate current 402. However, IGBT 404 is now switched off and is non-conducting. Current now flows through diode 403 and along path 405. From there, the current flows into capacitor 408 via path 406 and to the load via path 407. Current returns via path 409 and, in this example, through the armature coil that lags by 240 degrees via path 410. Thus, energy is being delivered from armature coils 401 and applied to both charging capacitor 408 and supplying power to the load (not shown) through the output terminals.

Thus the output voltage of the alternator/rectifier of the present invention can be varied independently of engine speed by using either or both the excitation current and the voltage boost circuit. At high engine speeds (e.g., a speed above a first threshold), the excitation current circuit can be used to regulate output voltage. At intermediate engine speeds (e.g., a speed between the first and a second threshold), both the excitation current circuit and the boost circuit can be used to regulate output voltage. At low engine speeds (e.g., a speed below the second threshold), the boost circuit can be used to regulate output voltage. The amount of boost provided is controlled by the duty cycle of the IGBT.

Figure 5:
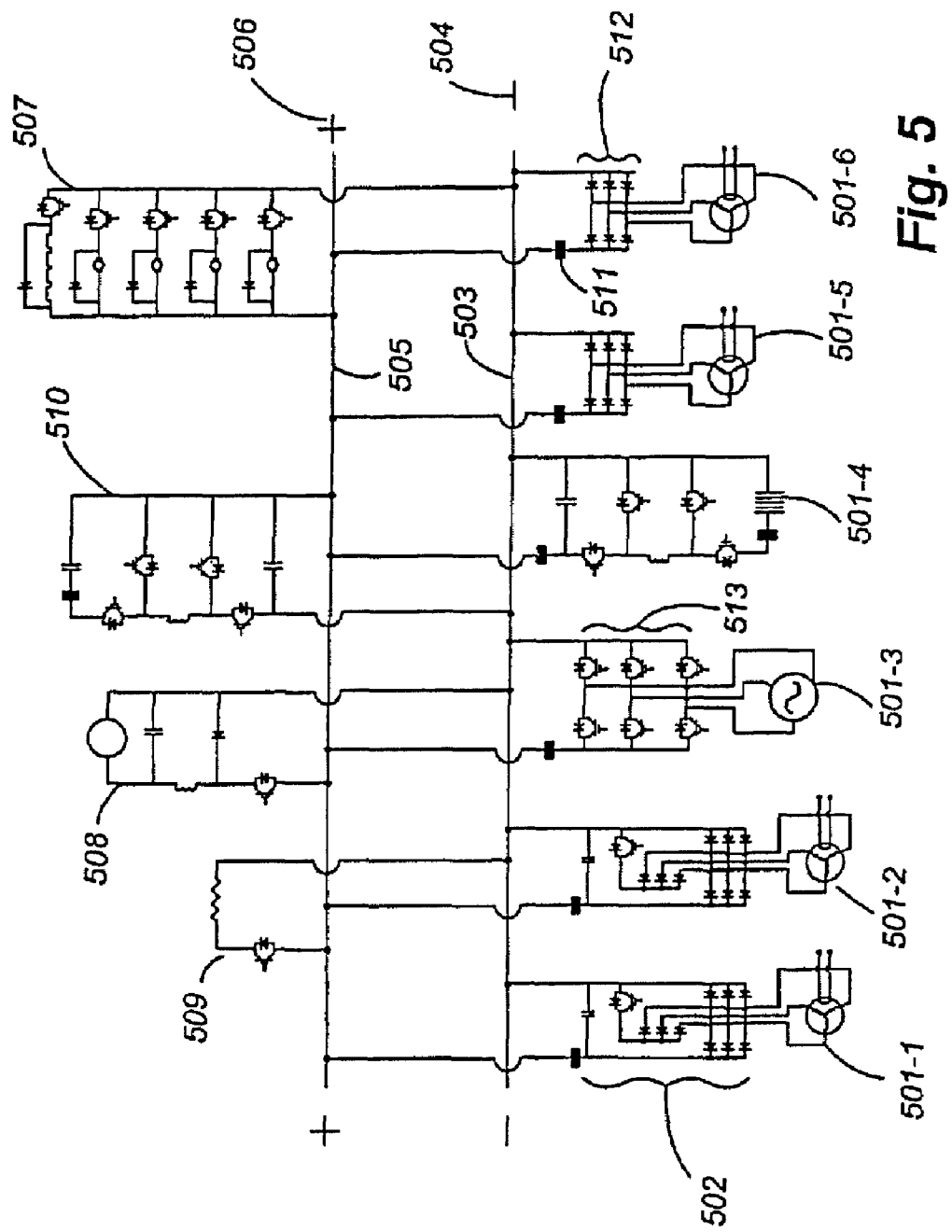
FIG. 5 is an example of the overall electrical schematic of a multi-engine locomotive power system.

FIG. 5 is a schematic circuit of the present invention applied to a locomotive with six prime power sources. Engines 501-1 and 501-2 are shown with voltage boost alternator/rectifiers 502. Engine 501-3 is shown with an induction alternator and converter system 513. The converter allows energy to flow to or from the DC bus to allow for energy to be dissipated in engine 501-3 if needed. Power source 501-4 is a fuel cell system with a buck/boost circuit for regulating the voltage output of the fuel cell. Engines 501-5 and 501-6 are shown with wound rotor alternator/rectifiers 512. These six prime power systems are the principal power sources providing power to a DC bus shown by conductors 503 and 505. Conductor 503 is shown here as the negative side 504 and conductor 505 is shown as the positive side 506. A capacitor bank 510 provides an energy storage capability. In the locomotive, the capacitor bank 510 can be used, for example, to control the range of voltages on the DC bus. The capacitor bank 510 may be maintained in a state-of-charge by DC power from one or more of the engines or from power from a dynamic braking system by, for example, a buck/boost circuit. The circuit of FIG. 5 also includes a propulsion system 507 shown here with 4 traction motors, an auxiliary power system 508 and a resistive grid 509 that provides a dynamic braking capability. This locomotive power circuit is an example of a multi-prime power source locomotive with regenerative braking capability that could be used, for example, as a road switcher. In this example, the DC bus may also allow power from the traction motors to be dissipated during dynamic braking and/or provide power to the capacitor bank 510 which may be used as an energy storage system and/or to start one or more of the engines (if configured such as engine 501-3). The six prime power systems are shown connected in parallel to the DC bus. The output DC current from each prime power system is measured by its own individual current sensor 511. The capacitor bank 510 may be used to provide power for starting one or more engines by any of a number of well-known methods. As can be appreciated, the energy storage system can also be a battery pack or a flywheel storage system. A similar electrical architecture for a multi-engine locomotive was disclosed previously in U.S. patent application Ser. No. 11/200,88 filed Aug. 19, 2005 entitled "Locomotive Power Train Architecture".

A road switcher may be required to provide maximum power when hauling a number of freight cars on a mainline between stations at moderate to high locomotive speeds. In this situation, the engines can be run at their optimum design speed to provide power to the DC bus and be operated at or near maximum fuel efficiency. In this case, there would be no need for the output voltage of the alternator/rectifier to be boosted.

On the other hand, the road switcher may be required to provide maximum torque at low locomotive speed when assembling a train in a switch yard. In this situation, the engines can be run at low speed to (1) augment power output from an energy storage unit such as battery pack for propulsive power or (2) charge the energy storage unit. In order for the engines to provide power to the DC bus at a voltage comparable to that of the energy storage unit and be operated at or near maximum fuel efficiency, the output voltage of the alternator/rectifiers would have to be boosted, as is possible with the present invention.

As can be appreciated, there can be other operational modes where one of the engines is run at full power and high rpm while the other engine is run at low speed but not idled. In this case, the engine run at high speed would not require an output voltage boost while the engine run at low speed would require an output voltage boost in order to have the necessary output voltage required to provide power to a DC bus and still optimize fuel efficiency.

The advantages of the present invention can be further illustrated by reference to maps of engine power, torque and fuel consumption versus engine speed.

Engine System Operating Modes

Figure 6:
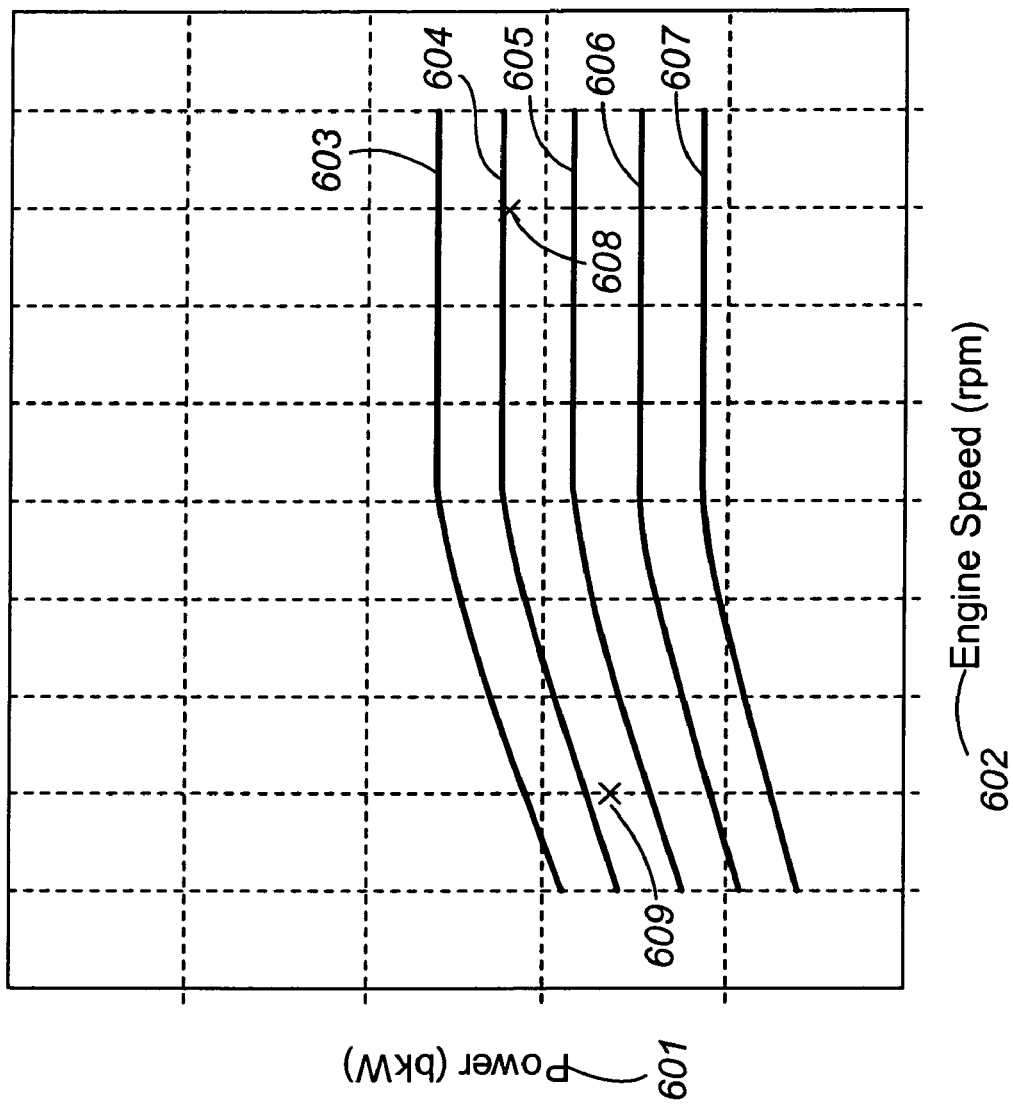
FIG. 6 is an plot of engine power versus engine speed.

A typical engine output power 601 versus engine speed 602 plot is shown in FIG. 6. Curves 603, 604, 605, 606 and 607 represent typical maximum engine power output versus engine speed for recommended uses as often specified by the engine manufacturer. Examples of types of uses are:

service 603 where maximum power is required for periodic overloads;
high intermittent service 604 and low intermittent service 605 where maximum power and/or speed are cyclic;
continuous service 606 where power and speed are cyclic
continuous heavy duty service 607 where the engine is operated at maximum power and speed without interruption or load cycling Locomotives typically operate in service where power and speed are continuous but cyclic and where the locomotive periodically requires operation at maximum overload power. A high speed operating point 608 where the output voltage of the alternator/rectifier requires no boost is shown along with a low speed operating point 609 where the output voltage of the alternator/rectifier requires a boost to continue to provide power to a DC bus such as shown in FIG. 5.

Figure 7:
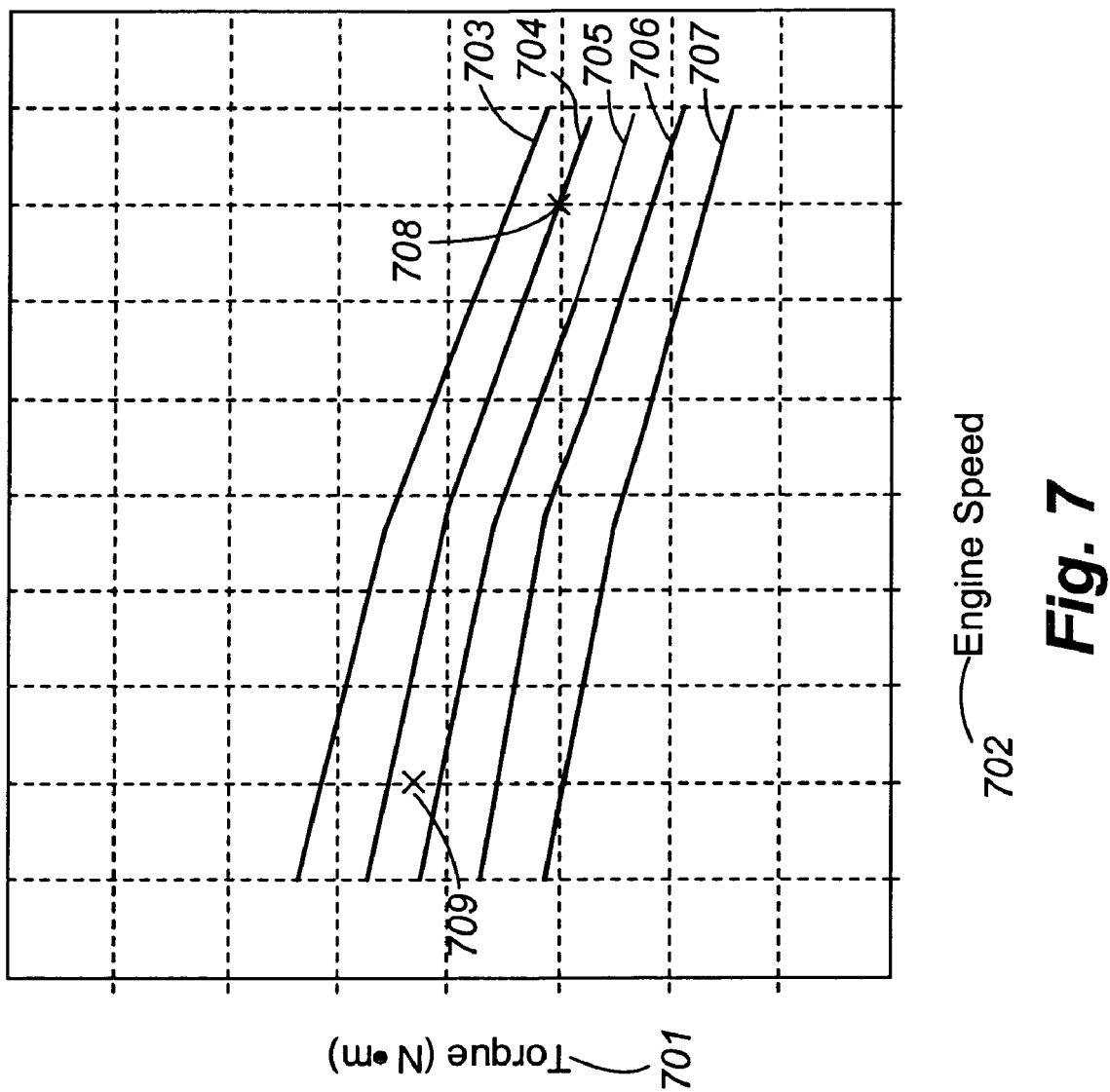
FIG. 7 is an plot of engine torque versus engine speed.

A typical engine output torque 701 versus engine speed 702 plot is shown in FIG. 7. Curves 703, 704, 705, 706 and 707 represent the torque at the corresponding power and speeds shown by curves 603, 604, 605, 606 and 607 of FIG. 6. Torque is proportional to power divided by rotary speed and therefore decreases with increasing engine speed when output power is approximately constant. A high speed operating point 708 is shown along with a low speed operating point 709, corresponding to the operating points 608 and 609 respectively of FIG. 6.

If a locomotive utilizes multiple diesel engines, then the control of these engines, as they are brought on-line to supply power to a DC bus or taken off-line, is the subject of the present invention. The following are examples of how diesel engines may be operated in various modes. As can be appreciated, similar operating modes may be used for other types of engines.

Examples of operating modes include:
maximum fuel efficiency mode
minimum emissions mode (whether of a substance or energy, such as noise)
a combination mode of good fuel efficiency and low emissions
maximum power mode
an optimum engine lifetime mode As can be appreciated, engines may be selected to operate in different modes at the same time. For example, some engines may be operated in a fuel efficient mode while others are operated in a low emissions mode such that, for example, the locomotive as a whole is operated at a desired overall fuel efficiency and emissions performance level.

Maximum Fuel Efficiency Mode

Figure 8:
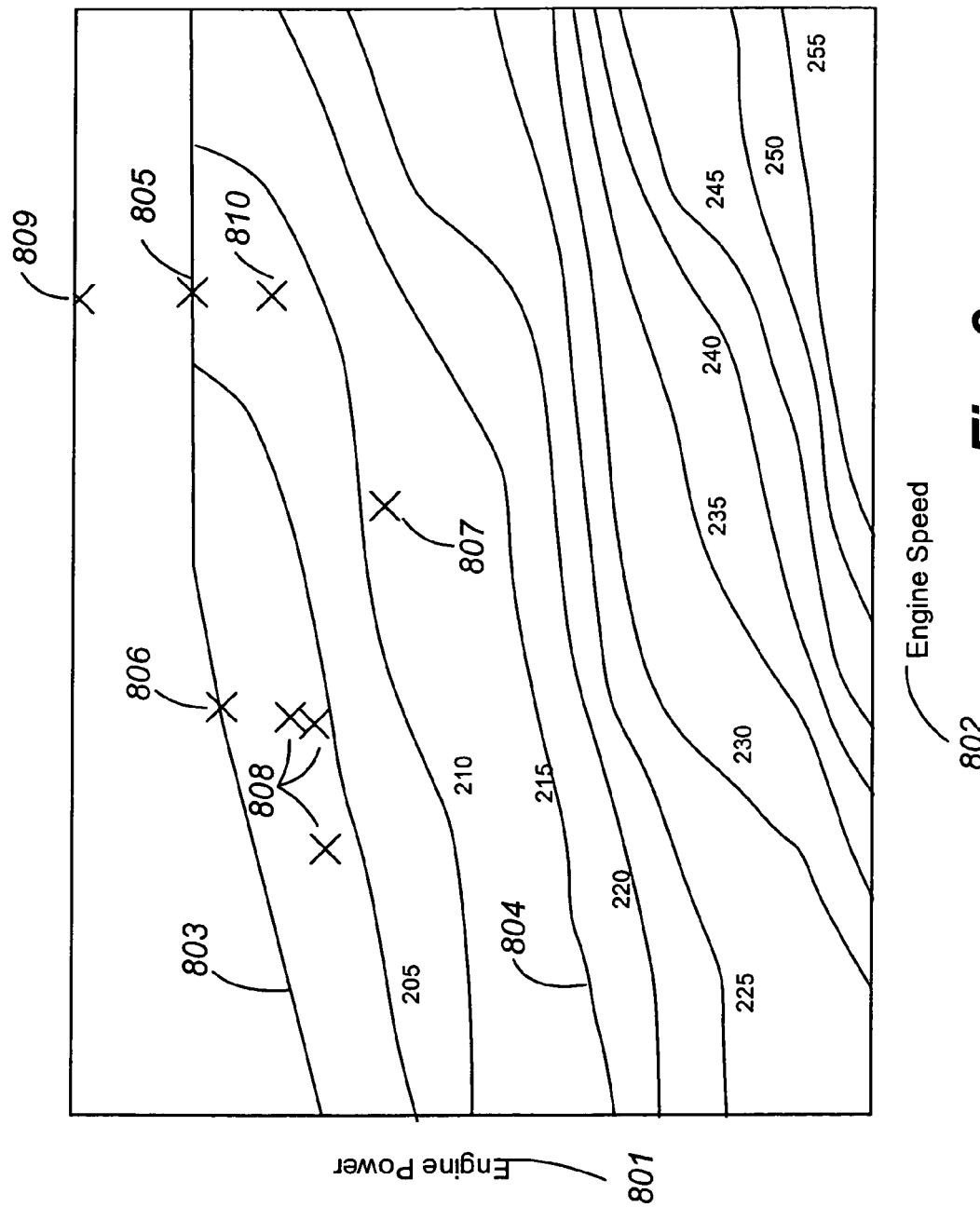
FIG. 8 is an example of a fuel map for a diesel engine.

A typical diesel engine fuel map is shown in FIG. 8. In this example, engine output power 801 is plotted versus engine speed 802. The power is typically in kW and the speed is typically in revolutions per minute ("rpms"). In some fuel maps, engine output torque may be plotted versus engine speed but in the present invention it is preferable to plot power versus speed. The maximum recommended power for a specific type of use (described previously in FIG. 6) available at any engine speed is shown by the power limit curve 803. Contours 804 of constant specific fuel consumption are also shown. The contours 804 are typically expressed as grams of fuel consumed per kW-hr of output energy or liters of fuel consumed per kW-hr of output energy. In the example contours shown in FIG. 8, the specific fuel consumption values of each contour are shown expressed grams of fuel consumed per kW-hr. In FIG. 8, a nominal predetermined operating point 805 is shown. A maximum fuel efficiency operating point 806 is shown where the output power and engine speed are lower than the nominal operating point. A minimum NOx emissions operating point 807 (described further in FIG. 9) is shown where the output power and engine speed are also lower than the nominal operating point and at a significantly lower power than the maximum fuel efficiency operating point 806. Operating points 808 all represent combinations of both lower specific fuel consumption and NOx emissions as compared to the nominal operating point 805. Operating point 809 is an example of increased output power at the same engine speed as the nominal operating point 805. This operating point may be selected for, for example, by the requirement for a short burst of maximum power for rapid acceleration. Typically, the control system on an engine can allow an engine to run at a higher power rating for a limited time, then will automatically derate the engine to a lower power curve after the specified time period has elapsed. Finally, operating point 810 is an example of reduced output power at the same engine speed as the nominal operating point 805 which may be selected for increasing engine lifetime. A combination of slightly increased engine speed and/or reduced operating power (as compared to the nominal operating point 805) may also be used to increase engine lifetime due to reduced internal pressures and stresses in the combustion cycle of the engine. The above illustrates an example of the use of a fuel map for determining a selected engine operating mode.

Minimum Emissions Mode

Figure 9:
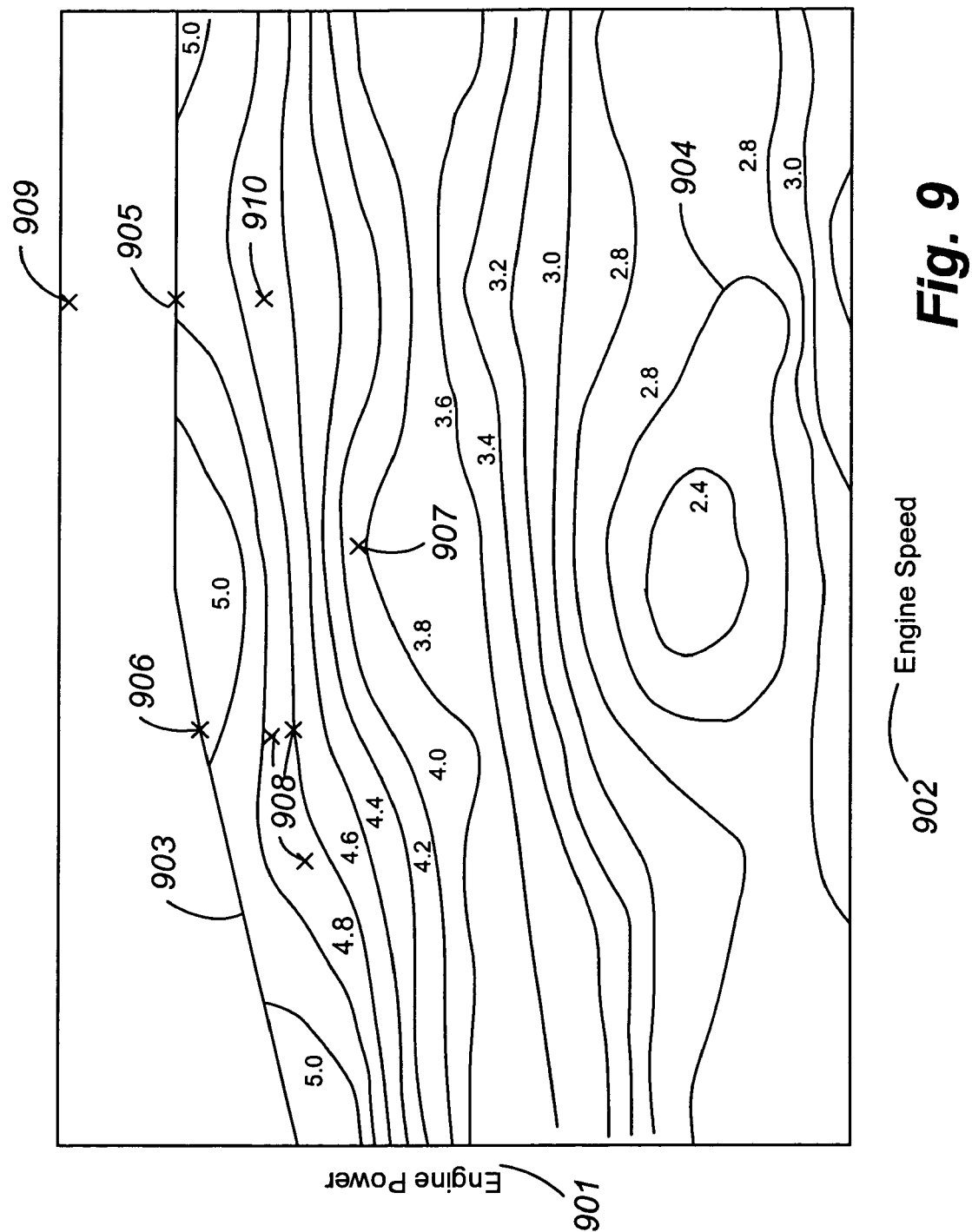
FIG. 9 is an example of an emissions map for a diesel engine.

A typical NOx emissions map is shown in FIG. 9. In this example, which corresponds to the fuel map of FIG. 8, engine output power 901 is plotted versus engine speed 902. The power is typically in kW and the speed is typically in revolutions per minute ("rpms"). In some emissions maps, engine output torque may be plotted versus engine speed but in the present invention it is preferable to plot power versus speed. The maximum recommended power for a specific type of use (described previously in FIG. 6) at any engine speed is shown by the power limit curve 903 and corresponds to limit curve 603 in FIG. 6. Contours 904 of constant specific NOx emissions are also shown. The contours 904 are typically expressed as grams of NOx emitted per kW-hr of output energy. In the example contours shown in FIG. 9, the specific NOx emission values of each contour are shown expressed grams of NOx emitted per kW-hr. In FIG. 9, a nominal predetermined operating point 905 is shown which corresponds to the nominal operating point 805 of FIG. 8. A maximum fuel efficiency operating point 906, a minimum NOx emissions operating point 907, a maximum power operating point 909 and a optimum engine lifetime operating point 910 are also shown and correspond to the maximum fuel efficiency, minimum NOx emissions, maximum power and optimum engine lifetime operating points of FIG. 8. Similarly, operating points 908 represent combinations of both lower specific fuel consumption and NOx emissions compared to the nominal operating point 905.

As can be seen, both fuel and emissions maps are used to select a desired operating mode, since, in general, fuel consumption improves with decreasing engine speed with little change in NOx emissions levels, while NOx emissions can be reduced with a reduction in power but at the expense of increased fuel consumption. As can be appreciated, operating points may also be selected to minimize particulate and other emissions using similar maps relating to these emissions.

Multi-Engine Control Loops

Figure 10:
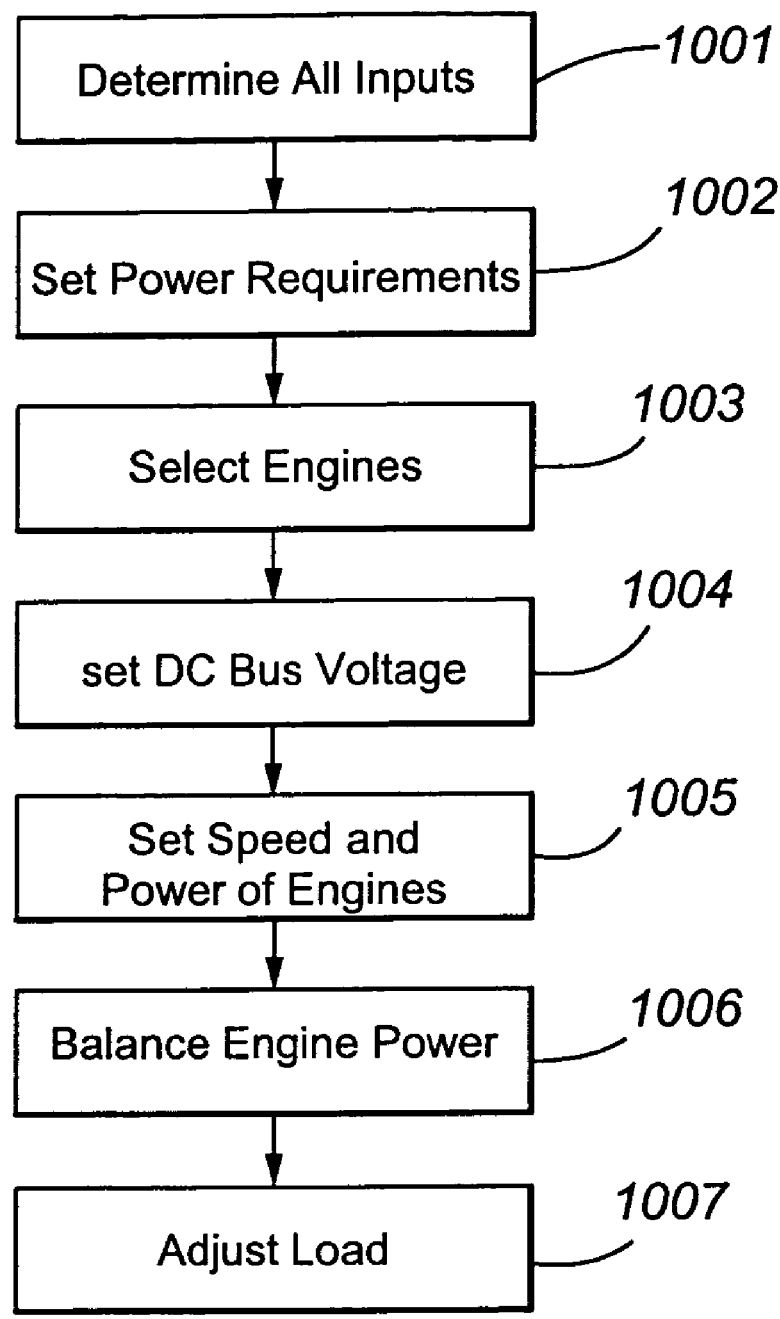
FIG. 10 is an overview flowchart showing the primary steps in a multi-engine control loop.

FIG. 10 is an overview flowchart showing the primary steps in a multi-engine control loop. In FIG. 10, step 1001 determines all the inputs required to set locomotive power requirements, select engines, set the DC bus voltage, set the power and speed of the engines, balance the flow of power from the engines and adjust the load if load control is available. Step 1002 is where the power requirements for the locomotive are established depending on a number of variables determined in step 1001. In step 1003, engines are selected. This includes the number of engines, the specific engines, which engines need to be activated for future use and which engines can be deactivated. In step 1004, the DC bus voltage is selected. A specific operating voltage is selected for the load control embodiment. The DC bus voltage is not determined in the embodiment which has no load control. In step 1005, the power and speed (rpms) of each engine is set based on the power requirements and engine operating mode determined in step 1002. In step 1206, the power outputs of all engines are measured by measuring current output from each alternator/rectifier systems. In this step, the power outputs are balanced so that each engine is contributing its pro rata share of the output power. This step is most preferably accomplished by adjusting alternator voltage boost to achieve sufficient output voltage from the alternator/rectifier to provide the required alternator/rectifier output current. This step is may alternately be accomplished by adjusting alternator excitation current to achieve the required alternator/rectifier output current. This step may also be accomplished by adjusting engine speed (rpms) to achieve the required alternator/rectifier output current. Finally, in step 1007, the load is adjusted if load control is used. In this step the power to the load is adjusted to equal the power available from the DC bus. This is accomplished for example by choppers which regulate DC traction motors or inverters which regulate AC motors.

Figure 11:
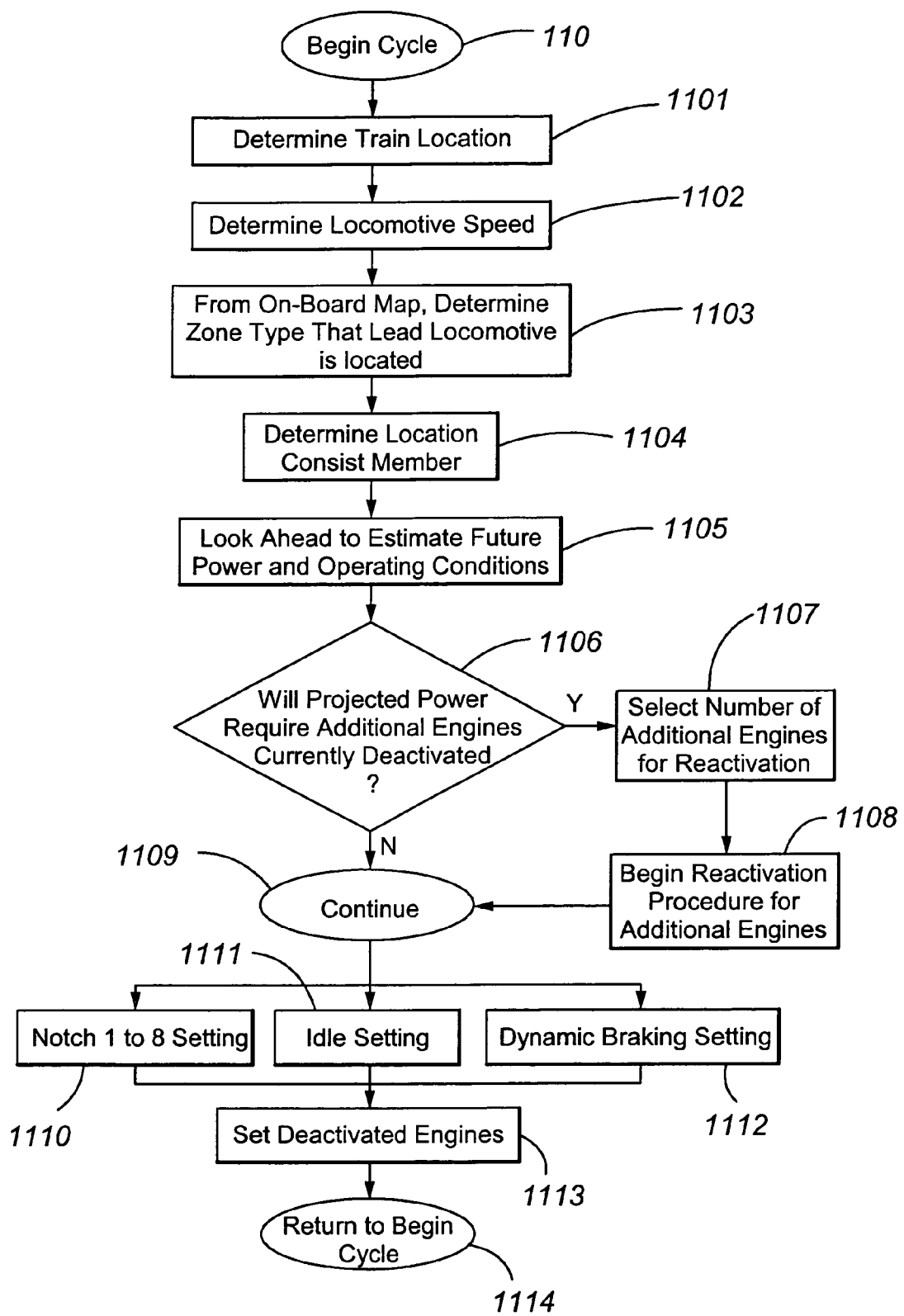
FIG. 11 is an example of a main flow chart of automated decision making for controlling the overall multi-engine selection process.

FIG. 11 is an example of a main flow chart of a simple automated decision making for controlling the overall multi-engine selection, operating and balancing process. This cycle of decisions can be executed continuously (for example every millisecond) or intermittently (for example every 1 second) or at intervals in between by a predetermined computer program or by a computer program that adapts, such as for example, a program based on neural network principles. As can be appreciated, many of the steps can be carried out in different sequences and some of the steps may be optional.

As is common practice, the choices of applying traction power, applying dynamic braking or operating the locomotive at idle to supply auxiliary power are made by the locomotive engineer or operator utilizing controls in the cab, or via a remote-control or equivalent system when, for example, in a switch yard.

As shown in the example of FIG. 11, an automated cycle begins 1100. The first step 1102 is to estimate the power requirements and operating mode of the locomotive. In step 1103, the requirement for additional engines currently deactivated is established from step 1102. If additional engines are required, then the number of currently deactivated engines that must be activated is determined in step 1104. This engine activation step is described more fully in FIG. 17. The engine activation procedure is implemented in step 1105 and the cycle then continues 1106. As noted above, the locomotive operating mode is commonly set by the locomotive's engineer. These are (1) a notch 1 to 8 power setting 1107, (2) an idle setting 1108, or (3) a dynamic braking setting 1109. For each of three power modes, it is possible that one or more engines may be deactivated. Deactivation means idling an engine so that it does not provide power to the DC bus, or shutting off the engine. The deactivation of engines is controlled in step 1110. Step 1111 returns to the beginning of the main control cycle.

Figure 12:
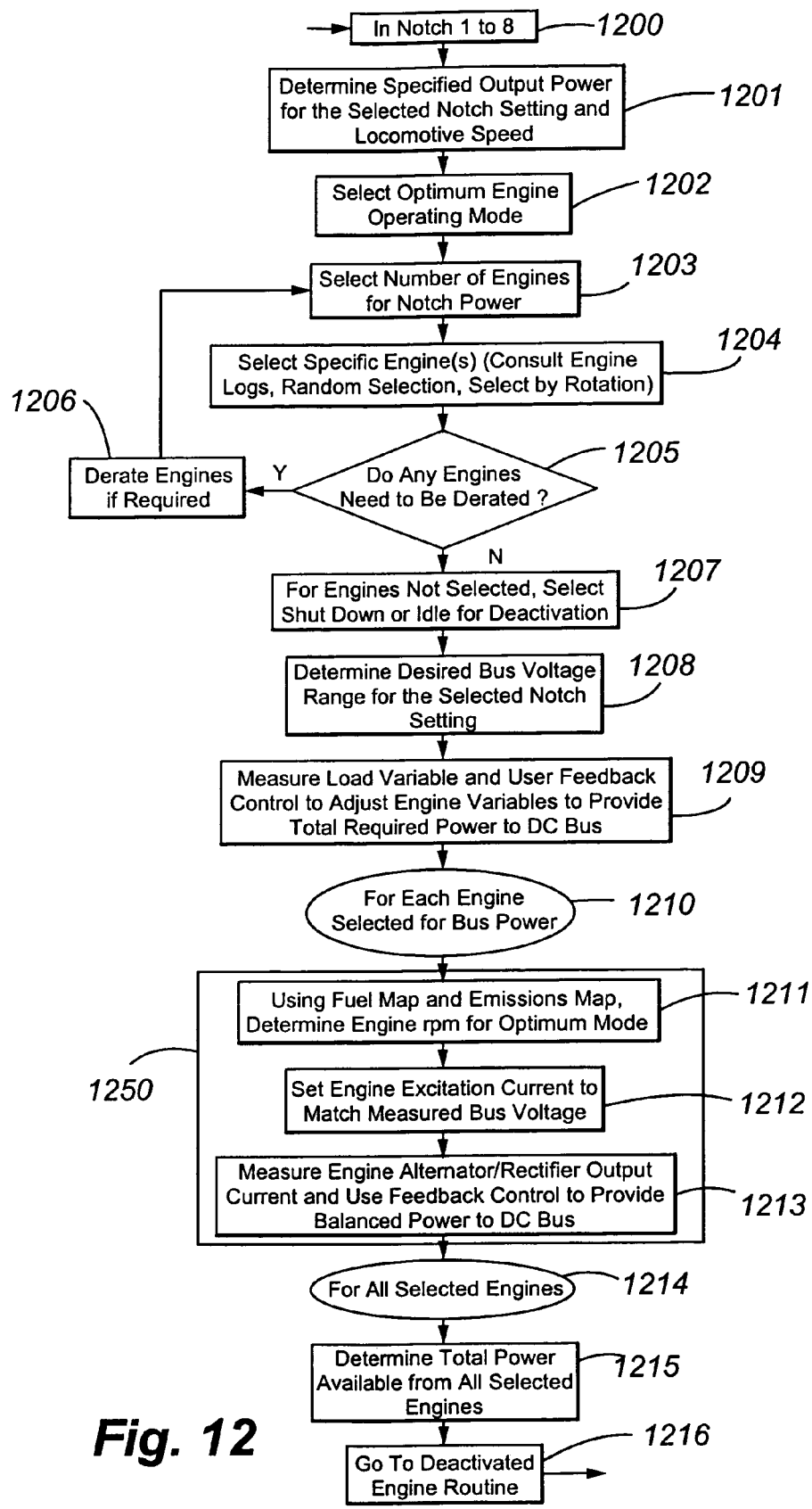
FIG. 12 is an example of a flow chart for selecting and configuring engines for any of the notch 1 to 8 power settings with no load control.

FIG. 12 shows an example of a flow chart for automated selection and configuration of engines for any of the notch 1 to 8 power settings 1200. This figure illustrates the process for a locomotive that does not have an independent means of load control. That is, the traction motors may be able to consume more power than the engines can provide, depending on engine alternator excitation settings and traction motor volts which are a function of locomotive speed. The first step 1201 is to determine the power associated with the notch number selected by the engineer and to determine the locomotive speed. The latter can be determined from a number of well-known means such as for example by a speedometer, by measuring axle rpms, by using a radar system and the like. Each notch number is typically associated with a predetermined power level at each locomotive speed, notch 1 being the lowest power setting and notch 8 being the highest power setting. As can be appreciated, the power level associated with each notch setting can be varied from time to time by reprogramming an on-board computer. The next step 1202 is to determine the desired engine operating mode. Examples of operating modes, which were previously illustrated in FIGS. 8 and 9, include a maximum fuel efficiency mode, a minimum emissions mode, a combination mode of good fuel efficiency and low emissions, an optimum engine lifetime mode, and a maximum power mode. The choice may be determined by the engineer or by a predetermined algorithm based on data from the locomotive's route location and requirements for the zone in which the locomotive or consist member is operating.

The next step 1203 is to determine the number of engines operative to provide power to the DC bus. Step 1203 may be carried out by an algorithm controlled by an on-board computer. It may also be based on a predetermined lookup table which associates each notch, each appropriate locomotive speed range and its various operating modes with an operating point such as described in FIGS. 8 and 9. It is also possible that, at some notch settings, all but one of the engines can be set at or near the selected operating points and the all but one engine can be used to balance out the total selected notch power by being set at a non-optimum operating point. Alternately, the all but one engine can be used to balance out the total selected notch power by using its alternator voltage boost to independently control its output voltage and thus can also be set at a its optimum operating point. This provides a degree of control over power output and operating points that is not available with a single large engine. A single large engine can be set at only one power and speed setting and often has to trade off better fuel economy for low emissions. In a multiple engine locomotive of the present invention, all but one of the power-producing engines (or all when alternator boost is available) can be tuned to optimize power, fuel consumption and emissions and often the one engine can be operated near its optimum operating point. In the step 1203 where all the engines are the same, selection of the number of engines operative to provide power to the DC bus is typically done by dividing the power requirement determined in step 1201 by the power rating of the engines and rounding the resulting number upwards. In the case where there are engines of differing power ratings, the selection algorithm may be more involved so as to balance the power contribution from each engine. In either case, the algorithm that selects the number of engines may consider the operating history of the engines, as indicated by step 1204, so as to avoid using some engines more than others and thereby approximately balancing the usage and maintenance period of the engines. An engine log typically contains information on engine usage (hours, fuel consumption, lubricant consumption, total rpms, megawatt-hours, hours in idle modes, hours in the various notch settings and hours in dynamic braking and the like) and maintenance history. Although less preferable than consulting an engine log, the selection algorithm may be engine selection by a random number between one and the number of available engines, which, over time, should tend to even out engine usage. The selection algorithm may be engine selection by rotation to the next engine in an engine sequence which, over time, should also tend to even out engine usage. In the next step 1205, a selected engine may need to be derated. For example, the selected engine may have one or more cylinders operating at less than optimum rating, the engine's control system may automatically derate the engine to a lower power after a specified time period of operating at a higher-than-normal power rating or any number of other well-known reasons for derating engine performance. If an engine is required to be derated 1206, then the procedure returns to step 1203 to re-select the number of engines since the derated engine may require an additional engine to provide the requested power. In the next step 1207, the engines not selected for providing power to the DC bus are identified for deactivation and may be selected to be idled or shut down to be deactivated. This deactivation procedure is controlled in step 1113 of the main flow chart (FIG. 11) and fully described in FIG. 16.

In the next step 1208, the DC bus voltage is measured. As the power consumed by the load (traction motors) increases beyond the optimum engine power capacity, the engine speeds will begin to decrease. In step 1209, typically a load variable such as total load current or torque is measured and used in a first control feedback loop to increase engine speeds by decreasing their alternator excitation currents which tends to decrease alternator output voltages. As this occurs for all the engines, the DC bus voltage drops, reducing the power to the load by reducing motor voltage until the total engine power output matches the power required by the load. This is a stable feedback process commonly carried out automatically for each engine by one of a number of well-known proportional integral differential ("PID") control algorithms. Thus, the DC bus voltage may be highly variable, typically ranging from near zero volts to well over 1,000 volts.

The next step 1210 begins an internal control loop 1250 for each engine to obtain a balanced power flow from each engine. Each engine has a fuel map which is typically a plot of engine power or torque versus engine rpms for various contours of constant specific fuel consumption, and an emissions map which is typically a plot of engine power or torque versus engine rpms for various contours of constant specific $NO_x$ emissions. As can be appreciated, there may be additional emissions maps for hydrocarbons and particulate matter and the like. In step 1211, the rpms of the selected engine is determined so as to produce the required power at the specific fuel consumption and emissions rate corresponding to the operating mode selected in step 1202. In step 1212, the excitation current for the alternator of each engine is selected to provide an alternator output voltage to fall within the range of the DC bus voltage measured in step 1208. When available, the amount of alternator boost may also be used to generate output voltage to fall within the range of the DC bus voltage measured in step 1208. This latter capability may be useful for example when an engine is derated or when an engine is operated at a lower power and rpm so that the engine may continue to supply power to the DC bus by having independent control over its alternator output voltage.

Step 1213 is a step where the current is measured at the output of each alternator's rectifier. This current, which is at the DC bus voltage, is a direct measure of the power flowing from the selected engine. An output current measurement is a sensitive and direct measure of power output of the alternator/rectifier apparatus to the DC bus. The measured current is used in a second control feedback loop to modify the engine's alternator excitation current to bring the engine's power contribution into balance with its pro rata portion of the total power to the DC bus. In the case where all engines are set to the same output power, each engine is balanced to deliver the same amount of power as the other engines to within a predetermined tolerance, preferably in the range of about ±5%. This second control feedback loop is designed to be a stable feedback process commonly carried out automatically for each engine by one of a number of well-known proportional integral differential ("PID") control algorithms.

The next step 1214 is executed for all engines after all engines have been balanced via internal control loop 1250. In step 1215, the total power from all engines to the DC bus is determined, preferably by measuring the currents at the output of each alternator's rectifier and multiplying the sum by the measured DC bus voltage. Once the allocation of power to the traction motors is determined 1215, the algorithm proceeds to the engine deactivation control loop 1216.

Figure 13:
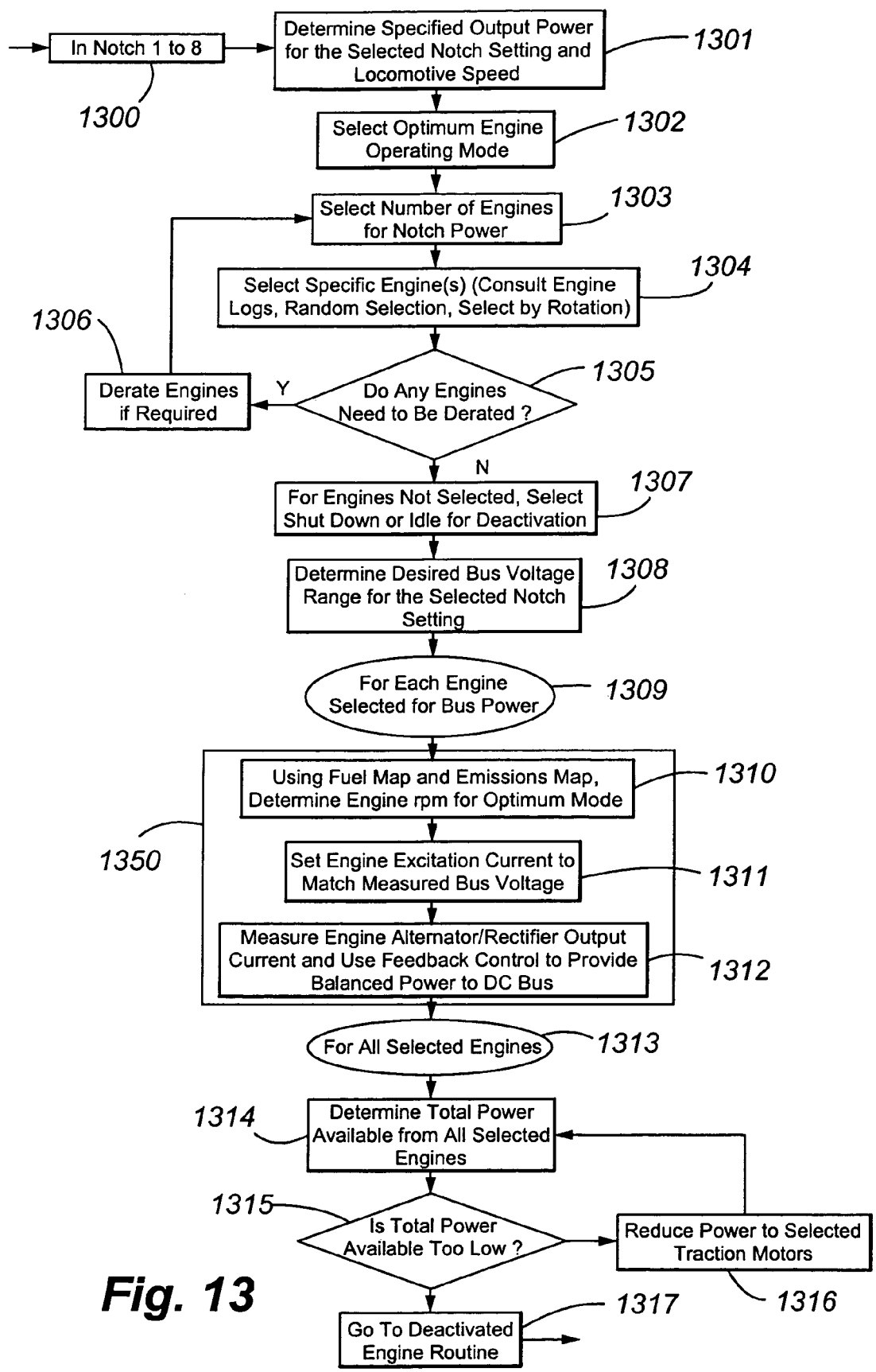
FIG. 13 is an example of a flow chart for selecting and configuring engines for any of the notch 1 to 8 power settings with load control.

FIG. 13 shows an example of a flow chart for automated selection and configuration of engines for any of the notch 1 to 8 power settings 1300. This figure illustrates the process for a locomotive that has an independent means of load control which is a preferred embodiment. That is, the power distributed to the traction motors is controlled independently such that the total power distributed to the load is controlled independently to match the power available from the engines. This may be done for example by using one or more choppers at the output of the DC bus to DC traction motors, or by using one or more inverters at the output of the DC bus to AC traction motors. The first step 1301 is to determine the power associated with the notch number selected by the engineer and to determine the locomotive speed. As can be appreciated, the power level associated with each notch setting can be varied from time to time by reprogramming an on-board computer. The next step 1302 is to determine the desired engine operating mode. Examples of operating modes are described in the discussion of FIG. 12. The choice may be determined by the engineer or by a predetermined algorithm based on data from the locomotive's route location and requirements for the zone in which the locomotive or consist member is operating.

The next step 1303 is to determine the number of engines operative to provide power to the DC bus. Step 1303 may be carried out by an algorithm controlled by an on-board computer. It may also be based on a predetermined lookup table which associates each notch, each appropriate locomotive speed range and its various operating modes with an operating point such as described in FIGS. 8 and 9. It is also possible as described previously that, at some notch settings, all but one of the engines can be set at or near the selected operating points and one engine can be used to balance out the total selected notch power by being set at a non-optimum operating point. In the step 1303 where all the engines are the same, selection of the number of engines operative to provide power to the DC bus is typically done by dividing the power requirement determined in step 1301 by the power rating of the engines and rounding the resulting number upwards. In the case where there are engines of differing power ratings, the selection algorithm may be more involved so as to balance the power contribution from each engine. In either case, the algorithm that selects the number of engines may consider the operating history of the engines, as indicated by step 1304, so as to avoid using some engines more than others and thereby approximately balancing the usage and maintenance period of the engines. Although less preferable than consulting an engine log, the selection algorithm may be engine selection by random number between one and the number of available engines, which, over time, should tend to even out engine usage. The selection algorithm may be engine selection by rotation to the next engine in an engine sequence which, over time, should also tend to even out engine usage. In the next step 1305, a selected engine may need to be derated. If an engine is required to be derated 1306, then the procedure returns to step 1303 to re-select the number of engines since the derated engine may require an additional engine to provide the required notch power. In the next step 1307, the engines not selected for providing power to the DC bus are identified for deactivation and may be selected to be idled or shut down to be deactivated. This deactivation procedure is controlled in step 1113 of the main flow chart (FIG. 11) and fully described in FIG. 16.

In the preferred load control embodiment, the next step 1308 is to set the desired nominal value and range for the DC bus voltage. The range is preferably ±75 volts from the nominal DC bus voltage, more preferably ±50 volts from the nominal DC bus voltage, and most preferably ±25 volts from the nominal DC bus voltage. This voltage may be set at a different predetermined nominal value for each notch setting, or at a predetermined nominal value for a range of notch settings, or at the same predetermined nominal value for all notch settings.

The next step 1309 begins an internal control loop 1350 for each engine to obtain a balanced power flow from each engine. Each engine has a fuel map and an emissions map or maps. In step 1310, the rpms of the selected engine is determined so as to produce the required power at the specific fuel consumption and emissions rate corresponding to the operating mode selected in step 1302. In step 1311, the excitation current for the alternator of each engine is selected to provide an alternator output voltage to match the selected DC bus voltage. Step 1312 is a step where the current is measured at the output of each alternator's rectifier. This current which is at the DC bus voltage is a direct measure of the power flowing from the selected engine. An output current measurement is a sensitive and direct measure of power output of the alternator/rectifier apparatus to the DC bus. The measured current is used in a control feedback loop to modify the engine's alternator excitation current to bring the engine's power contribution into balance with its pro rata portion of the total power to the DC bus. In the case where all engines are set to the same output power, each engine is balanced to deliver the same amount of power as the other engines within a predetermined tolerance, preferably about ±5%. This control feedback loop is designed to be a stable feedback process commonly carried out automatically for each engine by one of a number of well-known proportional integral differential ("PID") control algorithms.

The next step 1313 is executed for all engines after all engines have been set via internal control loop 1350. In step 1314, the total power from all engines to the DC bus is determined, preferably by measuring the currents at the output of each alternator's rectifier and multiplying the sum by the measured DC bus voltage. If the total power is too low 1315 to provide the required power to the traction motors, then the power to selected traction motors is reduced 1316 to the amount of power available from the DC bus. This power reduction can be made equal to all traction motors or can be allocated based on an algorithm that considers each powered wheel-set separately. The latter is an available strategy if each traction motor has its own power control apparatus (such as a chopper circuit for each DC traction motor or an inverter for each AC traction motor). Power may be selectively reduced for example on the leading wheel set in wet conditions. Once the allocation of power to the traction motors is determined 1314, the algorithm proceeds to the engine deactivation control loop 1317.

In a locomotive without an independent means of load control, if the engine power is too low to provide the required power to the traction motors, then (1) the engine power may be adjusted upwards or (2) the power to traction motors may be reduced by lowering the alternator excitation current until the alternator output voltage matches the traction motor voltage. In the preferred multi-engine locomotive control means of the present invention, if the total power from the engines is too low to provide the required power to the traction motors, then preferably the power to traction motors is reduced by a small amount to equal the power available. Alternately, another engine may be added to provide the necessary power in all but the highest notch setting. At the highest notch setting, it is still possible to increase the power output of one or more engines for periodic overloads. Thus, the control and balancing of output power from the engines can always be separately adjusted from the load power requirements of the traction motors by controlling a predetermined maximum load on the engines.

Figure 14:
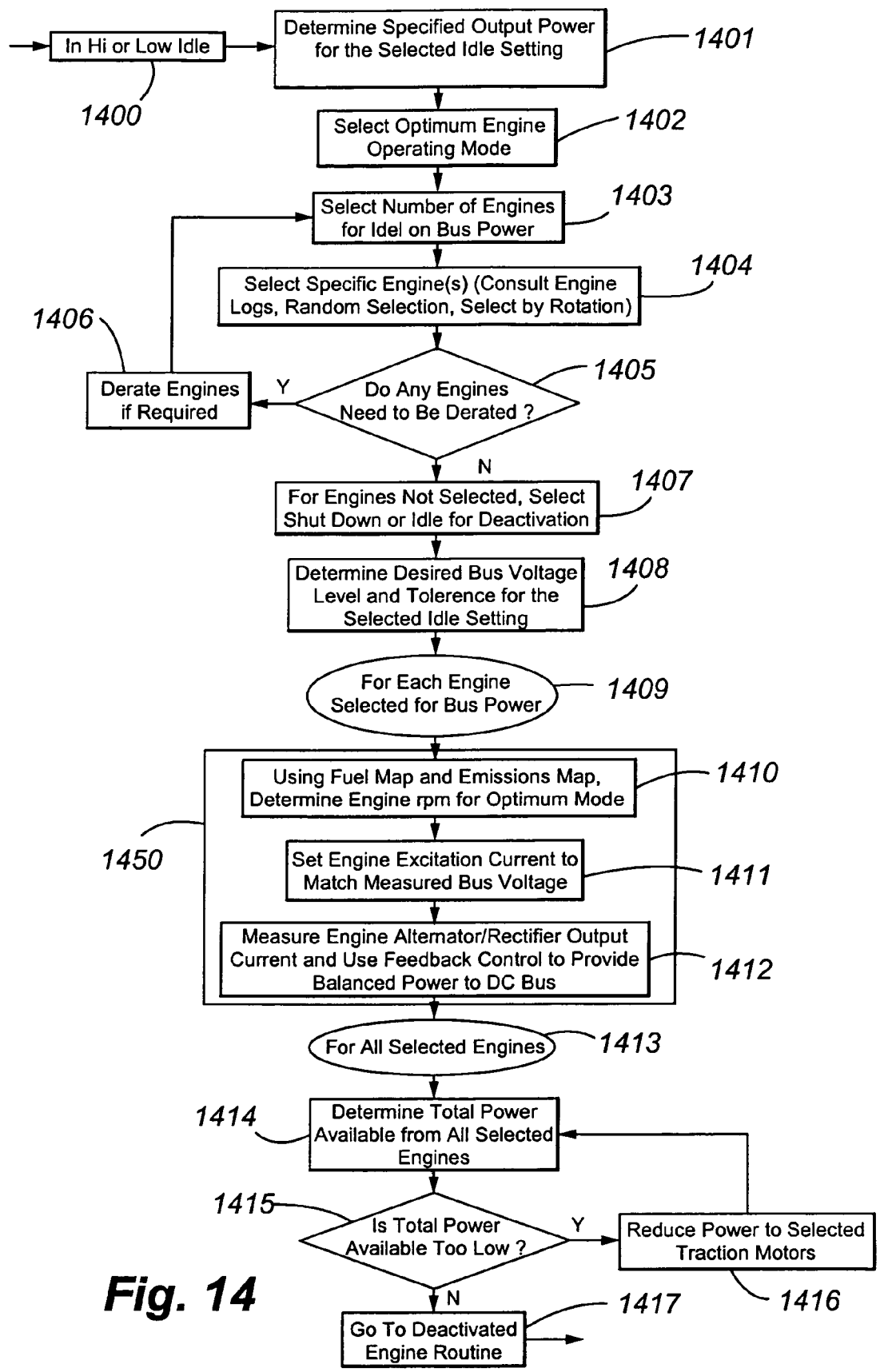
FIG. 14 is an example of a flow chart for selecting and configuring engines for any of number of idle settings.

FIG. 14 shows an example of a flow chart for automated selection and configuration of engines for any of number of idle settings 1400. Typically, a locomotive has a high idle and a low idle setting. The latter may be used, for example, to minimize fuel consumption for long periods of idle. This figure illustrates the process for a locomotive that has an independent means of load control similar to that described in FIG. 14, which is a preferred embodiment. As can be appreciated, the process can be modified for a locomotive that does not have an independent means of load control such as described in FIG. 12. The next step 1402 is to determine the desired engine operating mode. Examples of operating modes are described in the discussion of FIG. 12. The choice may be determined by the engineer or by a predetermined algorithm based on data from the locomotive's route location and requirements for the zone in which the locomotive or consist member is operating. The next step 1403 is to determine the number of engines operative to idle and provide power to the DC bus. Step 1403 may be carried out by an algorithm controlled by an on-board computer. It may also be based on a predetermined lookup table which associates each idle setting and its various operating modes with an operating point such as described in FIGS. 8 and 9. It is also possible that, at some idle settings, all but one of the engines can be set at or near the selected operating points and the all but one engine can be used to balance out the total selected idle power by being set at a non-optimum operating point. Alternately, the all but one engine can be used to balance out the total selected notch power by using its alternator voltage boost, if available, to independently control its output voltage and thus can also be set at a its optimum operating point. This provides a degree of control over power output and operating points that is not available with a single large engine. In the step 1403 where all the engines are the same, selection of the number of engines operative to provide power to the DC bus is typically done by dividing the power requirement determined in step

1401 by the power rating of the engines and rounding the resulting number upwards. In the case where there are engines of differing power ratings, the selection algorithm may be more involved so as to balance the power contribution from each engine. In either case, the algorithm that selects the number of engines may consider the operating history of the engines, as indicated by step 1404, so as to avoid using some engines more than others and thereby approximately balancing the usage and maintenance period of the engines. Although less preferable than consulting an engine log, the selection algorithm may be engine selection by random number between one and the number of available engines, which, over time, should tend to even out engine usage. The selection algorithm may be engine selection by rotation to the next engine in an engine sequence which, over time, should also tend to even out engine usage. In the next step 1405, a selected engine may need to be derated. If an engine is required to be derated 1406, then the procedure returns to step 1403 to re-select the number of engines since the derated engine may require an additional engine to provide the required idle power. In the next step 1407, the engines not selected for providing power to the DC bus are identified for deactivation and may be selected to be idled but not providing power to the DC bus, or shut down to be deactivated. This deactivation procedure is controlled in step 1113 of the main flow chart (FIG. 11) and fully described in FIG. 16.

In the preferred load control embodiment, the next step 1408 is to set the desired nominal value and range for the DC bus voltage. The range is preferably ±75 volts from the nominal DC bus voltage, more preferably ±50 volts from the nominal DC bus voltage, and most preferably ±25 volts from the nominal DC bus voltage. This voltage may be set at a different predetermined value for each idle setting but most preferably at the same predetermined value for all idle settings.

The next step 1409 begins an internal control loop 1450 for each engine to obtain a balanced power flow from each engine. Each engine has a fuel map and an emissions map or maps. In step 1410, the rpms of the selected engine is determined so as to produce the required power at the specific fuel consumption and emissions rate corresponding to the operating mode selected in step 1402. In step 1411, the excitation current for the alternator of each engine is selected to provide an alternator output voltage to match the selected DC bus voltage. When available, the amount of alternator boost may also be used to generate output voltage to fall within the range of the DC bus voltage measured in step 1408. Step 1412 is a step where the current is measured at the output of each alternator's rectifier. This current which is at the DC bus voltage is a direct measure of the power flowing from the selected engine. An output current measurement is a sensitive and direct measure of power output of the alternator/rectifier apparatus to the DC bus. The measured current is used in a control feedback loop to modify the engine's alternator excitation current to bring the engine's power contribution into balance with its pro rata portion of the total power to the DC bus. In the case where all engines are set to the same output power, each engine is balanced to deliver the same amount of power as the other engines within a predetermined tolerance, preferably about ±5%. This control feedback loop is designed to be a stable feedback process commonly carried out automatically for each engine by one of a number of well-known proportional integral differential ("PID") control algorithms.

The next step 1413 is executed for all engines after all engines have been set via internal control loop 1450. In step 1414, the total power from all engines to the DC bus is determined, preferably by measuring the currents at the output of each alternator's rectifier and multiplying the sum by the measured DC bus voltage. If the total power is too low 1415 to provide the required power to provide for the idling locomotive, then the idle setting may be changed 1416 to a higher setting, the power provided at the selected idle setting may be increased or the power required by the locomotive may be reduced. A reduction in the hotel power required for a passenger train idling in a station is an example of the latter. Once the allocation of power to the auxiliary power needs is set to match the available power from all the idled but power-contributing engines, the algorithm proceeds to the engine deactivation control loop 1417.

Figure 15:
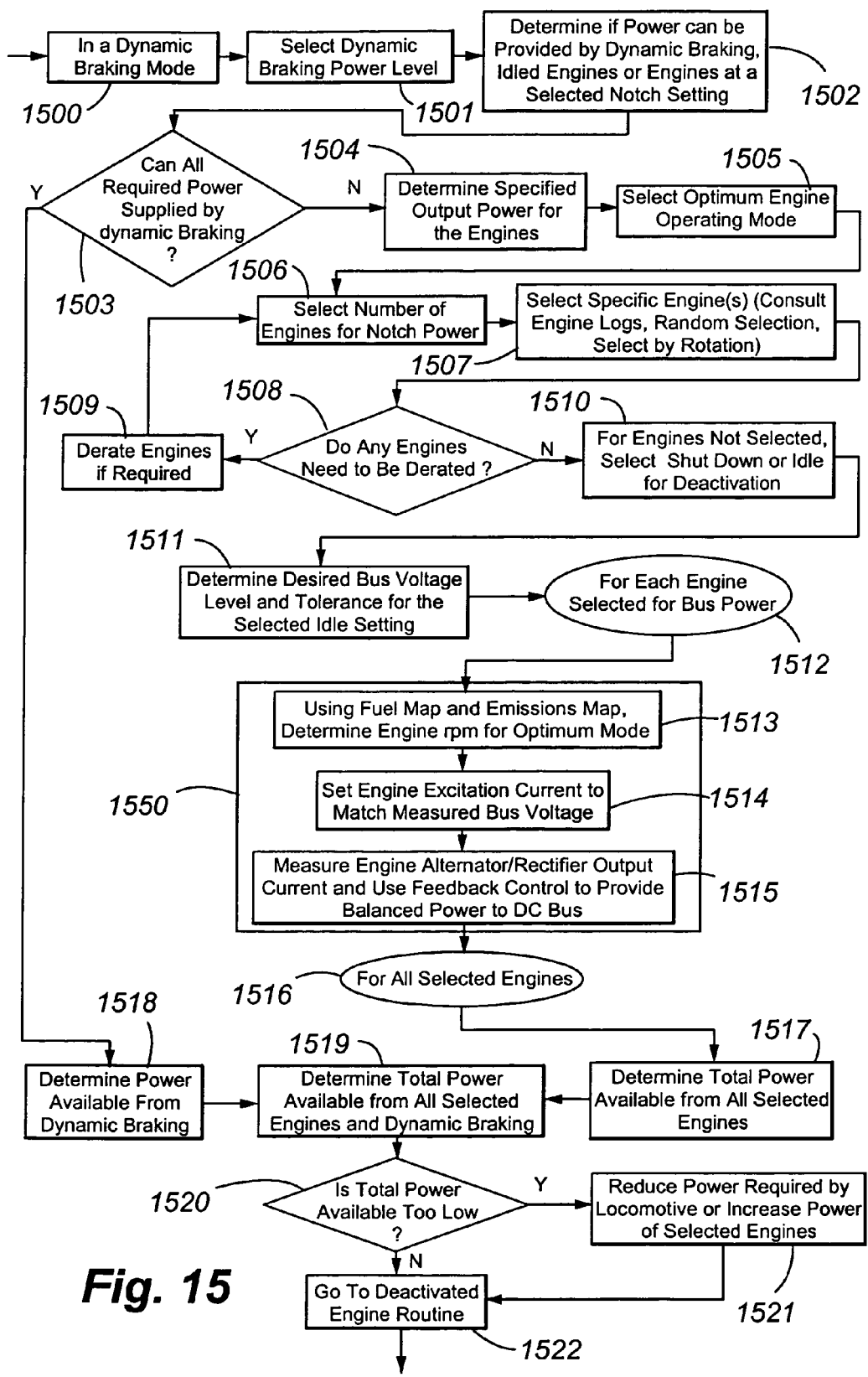
FIG. 15 is an example of a flow chart for selecting and configuring engines for dynamic braking.

FIG. 15 shows an example of a flow chart for automated selection and configuration of engines for dynamic braking 1500. This figure illustrates the process for a locomotive that has an independent means of load control similar to that described in FIG. 13, which is a preferred embodiment. It is understood that the traction motors act as generators during dynamic braking and can provide power back to flow to the DC bus. As can be appreciated, the power level provided by dynamic braking can be controlled by power control circuits associated with the traction motors. The first step 1501 is to estimate the power required by the locomotive during the projected period that the locomotive is expected to be in dynamic braking mode. This can be accomplished using the information available on the locomotive's location along its route and its projected route. The next step 1502 is to determine whether the projected power requirements can be met by dynamic braking or whether some engine power will also be required. If all the required power can be supplied by dynamic braking 1503, then no engines need be engaged to provide power to the DC bus. This situation can arise, for example, if the train is traveling down a lengthy grade. In this case, the power from dynamic braking may exceed the auxiliary requirements of the locomotive and some of the dynamic braking energy may be switched to a resistive grid for dissipation. As can be appreciated, substantial auxiliary power may be required to operate the traction motor blowers that provide cooling during high current operation typical of dynamic braking and this may require some engine power to the DC bus. In the case where dynamic braking is intermittent or only operative for a short period, engines may be required to provide additional power to the DC bus. If engines are required, they may be operated in an idle setting or a notch power setting, depending on the locomotive's requirements. For example, a road switcher may not require substantial auxiliary power during braking but a commuter train with a large hotel load, may require more power than is available through dynamic braking alone. If engines are required, the next step 1504 is to set the output power required by the engines.

The next step 1505 is to determine the desired operating mode of the engines. Examples of operating modes include a maximum fuel efficiency mode, a minimum emissions mode, a combination mode of good fuel efficiency and low emissions and an optimum engine lifetime mode. The choice may be determined by the engineer or by a predetermined algorithm based on data from the locomotive's route location and requirements for the zone in which the locomotive or consist member is operating. The next step 1506 is to determine the number of engines operative to provide power to the DC bus. This step, which is essentially the same as that described in step 1204 of FIGS. 12 and 1304 in FIG. 13 is typically done by dividing the power requirement determined in step 1504 by the power rating of the engines and rounding the resulting number upwards in the case where all the engines are the same. In the case where there are engines of differing power ratings, the selection algorithm may be more involved so as to balance the power contribution from each engine. In either case, the algorithm that selects the number of engines may consider the operating history of the engines, as indicated by step 1507, so as to avoid using some engines more than others and thereby approximately balancing the usage and maintenance period of the engines. Although less preferable than consulting an engine log, the selection algorithm may be engine selection by random number between one and the number of available engines, which, over time, should tend to even out engine usage. The selection algorithm may be engine selection by rotation to the next engine in an engine sequence which, over time, should also tend to even out engine usage. In the next step 1508, a selected engine may need to be derated. If an engine is required to be derated 1509, then the procedure returns to step 1506 to re-select the number of engines since the derated engine may require an additional engine to provide the required idle power. In the next step 1510, the engines not selected for providing power to the DC bus are identified for deactivation and may be selected to be idled but not providing power to the DC bus, or shut down to be deactivated. This deactivation procedure is controlled in step 1113 of the main flow chart (FIG. 11) and fully described in FIG. 16.

In the preferred load control embodiment, the next step 1511 is to set the desired nominal value and range for the DC bus voltage. The range is preferably ±75 volts from the nominal DC bus voltage, more preferably ±50 volts from the nominal DC bus voltage, and most preferably ±25 volts from the nominal DC bus voltage. This voltage may be set at a different predetermined value depending on the amount of power estimated from dynamic braking and from the power that can be supplied by the engines. It also depends whether the engines will provide power from an idle setting (such as for example high idle) or from a notch power setting.

The next step 1512 begins an internal control loop 1550 for each engine to obtain a balanced power flow from each engine. Each engine has a fuel map and an emissions map or maps. In step 1513, the rpms of the selected engine is determined so as to produce the required power at the specific fuel consumption and emissions rate corresponding to the operating mode selected in step 1505. In step 1514, the excitation current for the alternator of each engine is selected to provide an alternator output voltage to match the selected DC bus voltage. Step 1515 is a step where the current is measured at the output of each alternator's rectifier. This current which is at the DC bus voltage is a direct measure of the power flowing from the selected engine. An output current measurement is a sensitive and direct measure of power output of the alternator/rectifier apparatus to the DC bus. The measured current is used in a control feedback loop to modify the engine's alternator excitation current to bring the engine's power contribution into balance with its pro rata portion of the total power to the DC bus. In the case where all engines are set to the same output power, each engine is balanced to deliver the same amount of power as the other engines within a predetermined tolerance, preferably about ±5%. This control feedback loop is designed to be a stable feedback process commonly carried out automatically for each engine by one of a number of well-known proportional integral differential ("PID") control algorithms.

The next step 1516 is executed for all engines after all engines have been set via internal control loop 1550. In step 1517, the total power from all selected engines is determined, preferably by measuring the currents at the output of each alternator's rectifier and multiplying the sum by the measured DC bus voltage. The power available from dynamic braking is determined in step 1518. The total power available to the locomotive or consist member is determined in step 1519 which is the sum of the power to the DC bus from the engines and dynamic braking. If the total power is too low 1520 to provide the required power for the braking locomotive, then the power provided by the selected engines may be increased 1521 or the power required by the locomotive may be reduced 1521. Once the allocation of power to the auxiliary power needs is set to match the available power from the selected engines and dynamic braking, the algorithm proceeds to the engine deactivation control loop 1522.

Figure 16:
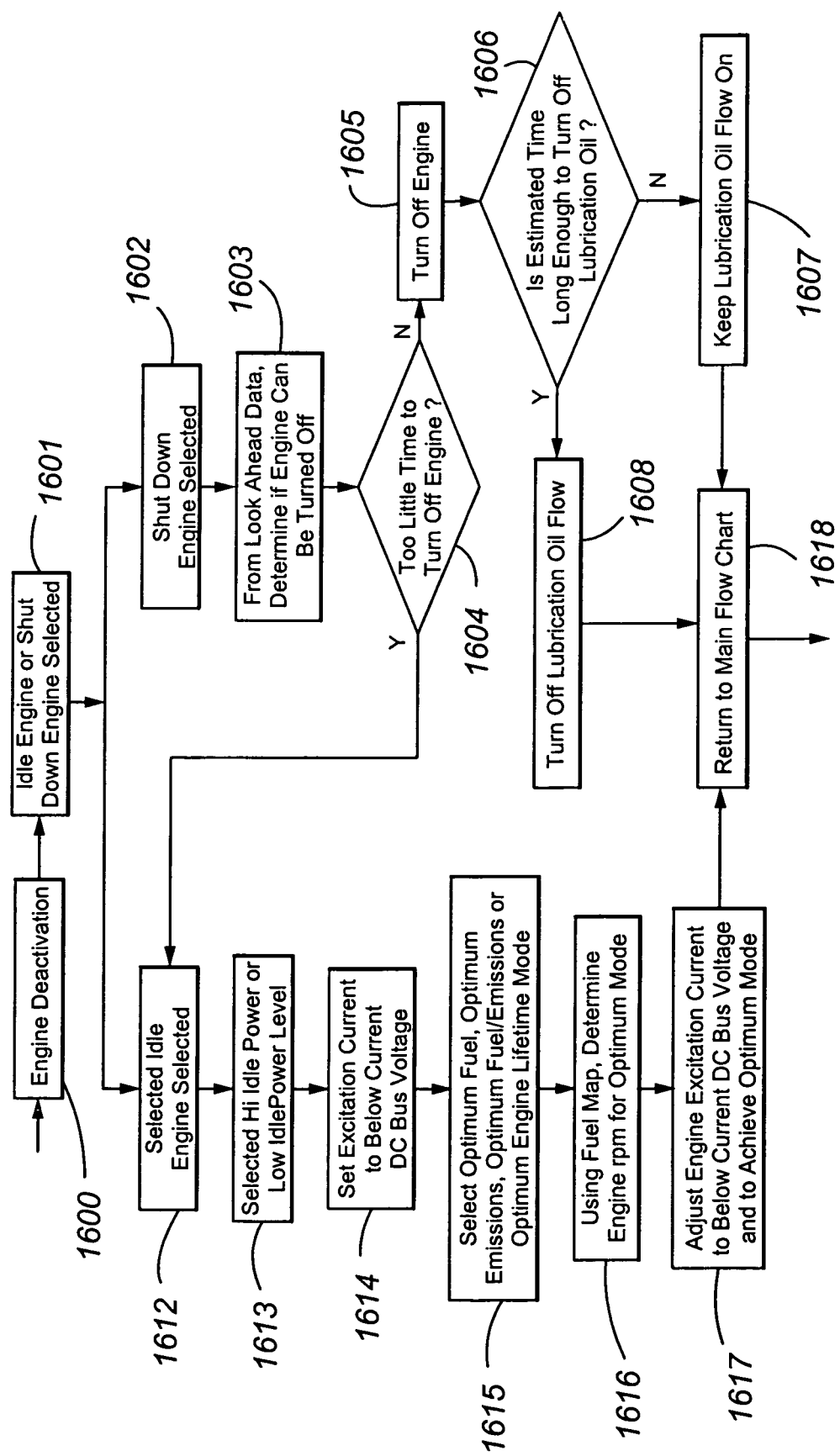
FIG. 16 is an example of a flow chart for controlling engine deactivation.

FIG. 16 is an example of a flow chart for controlling engine deactivation 1600. Deactivation means idling an engine so that it does not provide power to the DC bus; or shutting off the engine. In step 1601, an engine is selected to be idled or shut down for deactivation. If shut down is selected 1602, then the look-ahead route information is queried 1603 to determine if the engine may be needed within a first predetermined time 1604 in which case the shut down selection would not be efficient. If there is too little time before the engine is required again, then the idle mode for deactivation is automatically selected 1612. If there is sufficient time to shut down the engine, then the engine is selected to be turned off 1605. Again, the look-ahead route information is queried 1606 to determine if the engine may be needed within a second predetermined time 1606. Typically, the second predetermined time is longer than the first predetermined time. For example, the second predetermined time may be associated with long periods of low speed operation or idling. If there is too little time before the engine is required again, then the engine lubricating oil circulation is maintained operative 1607. If there is sufficient time to turn off the lubricating oil circulation system, it is turned off 1608.

If idling is selected 1612 for engine deactivation, the next step 1613 is to determine the power associated with the idle setting selected by the engineer. The next step 1614 is to set engine alternator excitation current so that the alternator output voltage is sufficiently below the currently selected DC bus voltage. The next step 1615 is to determine the desired operating mode. Examples of operating modes include a maximum fuel efficiency mode, a minimum emissions mode, a combination mode of good fuel efficiency and low emissions and an optimum engine lifetime mode. The next step 1616 is to use the engine's fuel map to determine the engine idle rpms to achieve the operating mode selected in step 1615. Step 1617 is optional and is used to adjust excitation current to move the operating point closer to the optimum value selected in step 1615 while ensuring the output voltage remains well below the operating DC bus voltage. Once the selected engine is deactivated by idling or turning it off (with or without the lubricating oil circulating), then the algorithm returns to the main flow control chart 1618.

Figure 17:
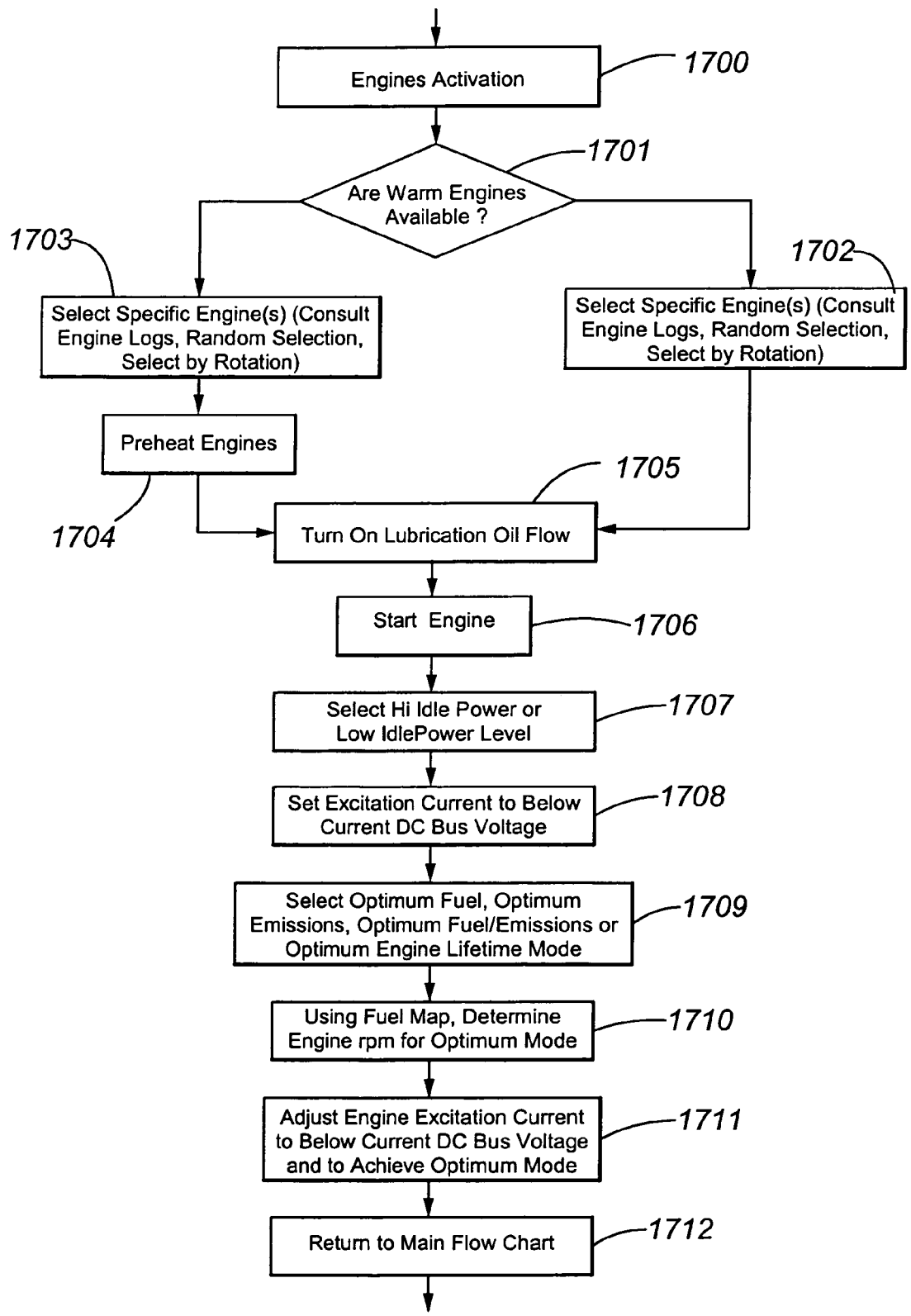
FIG. 17 is an example of a flow chart for activating an engine.

FIG. 17 is an example of a flow chart for controlling activating an engine 1700. The first step 1701 is to determine if warm engines are available. In either case, the algorithm that selects the engines may consider the operating history of the engines, as indicated by step 1702 or 1703, so as to avoid using some engines more than others and thereby approximately balancing the usage and maintenance period of the engines. Although less preferable than consulting an engine log, the selection algorithm may be engine selection by random number between one and the number of available engines, which, over time, should tend to even out engine usage. The selection algorithm may be engine selection by rotation to the next engine in an engine sequence which, over time, should also tend to even out engine usage. If there are no warm engines available, then the selected engine is preheated 1704. Thereafter, the lubricating oil flow for the selected engine is turned on 1705. The selected engine is then started 1706 and set to one of the available idle settings 1707 as selected by the engineer. The next step 1708 is to set engine alternator excitation current so that the alternator output voltage is sufficiently below the currently selected DC bus voltage. The next step 1709 is to determine the desired operating mode. Examples of operating modes include a maximum fuel efficiency mode, a minimum emissions mode, a combination mode of good fuel efficiency and low emissions and an optimum engine lifetime mode. The next step 1710 is to use the engine's fuel map to determine the engine idle rpms to achieve the operating mode selected in step 1709. Step 1711 is optional and is used to adjust excitation current to move the operating point closer to the optimum value selected in step 1709 while ensuring the output voltage remains well below the operating DC bus voltage. Once the selected engine is activated, then the algorithm returns to the main flow control chart 1712.

Figure 18:
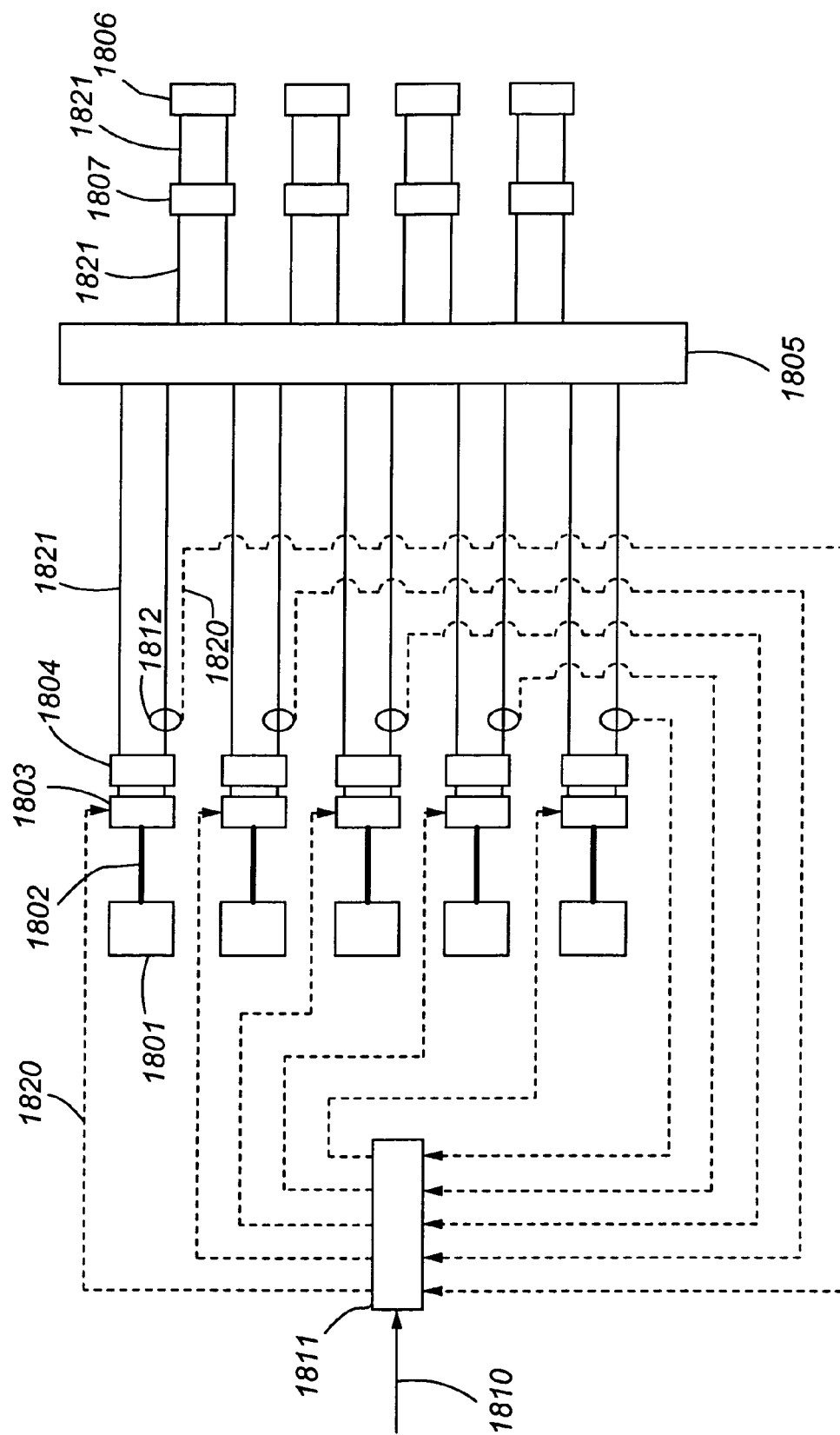
FIG. 18 is a schematic of a multi-engine current-based control feedback system.

FIG. 18 is a schematic of a preferred embodiment of multi-engine current-based control feedback system. This schematic shows five engines 1801, each connected by mechanical shafts 1802 to corresponding alternators 1803. Rectifiers 1804 are electrically connected to the outputs of alternators 1803 to provide DC power to a common DC bus 1805. In this embodiment, the output of the DC bus 1805 provides power to four traction motors 1806, each shown with load control apparatuses 1807. The electrical outputs of the alternator/rectifiers are connected in parallel with the DC bus 1805. The load controlled traction motors are also shown connected in parallel with the DC bus 1805. This figure illustrates a preferred engine balancing control feedback loop. An input command 1810 (for example a selected power level) is issued to a controller 1811. The output currents from each engines's alternator/rectifier are measured by current sensors 1812 which are monitored by the controller 1811. The controller 1811 then uses the measured currents in a control feedback loop to modify each engine's alternator 1803 excitation current or alternator voltage boost to bring each engine's power contribution into balance with its pro rata portion of the total power to the DC bus. The control feedback loop is typically one of a number of well-known proportional integral differential ("PID") control algorithms. The dotted lines 1820 represent current feedback control circuit connections while the solid lines 1821 represent power distribution circuit connections.

Figure 19:
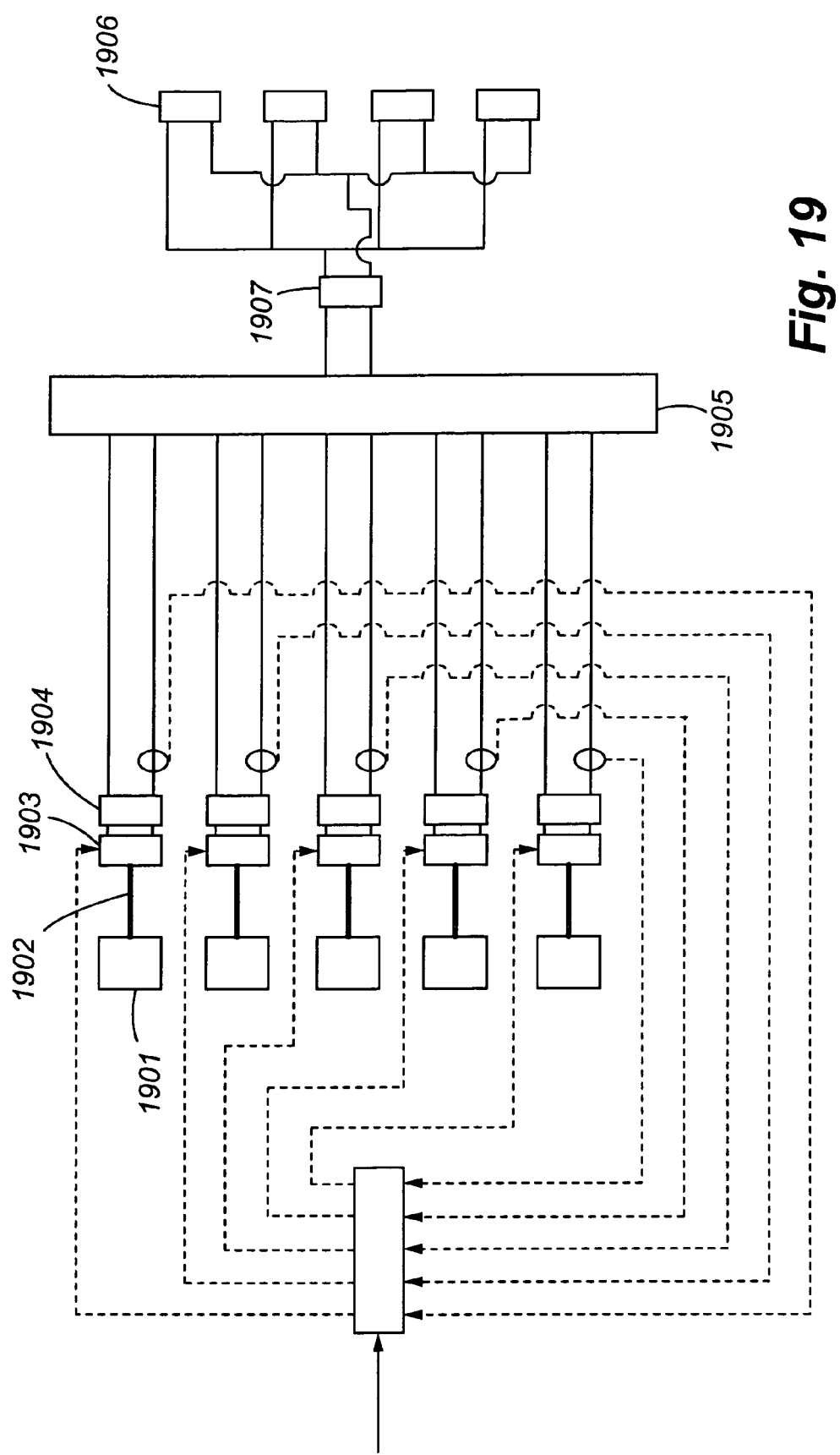
FIG. 19 is a schematic of an alternate multi-engine current-based control feedback system.

FIG. 19 is a schematic of an alternate multi-engine current-based control feedback system where a single load control apparatus is used for all traction motors. This schematic shows five engines 1901, each connected by mechanical shafts 1902 to corresponding alternators 1903. Rectifiers 1904 are electrically connected to the outputs of alternators 1903 to provide DC power to a common DC bus 1905. In this embodiment, the output of the DC bus 1905 provides power to four traction motors 1906 where a single load control apparatus 1907 controls the flow of power top all the traction motors 1906. The electrical outputs of the alternator/rectifiers are connected in parallel with the DC bus 1709. The load controlled traction motors are also shown connected in parallel with the DC bus 1905. This figure illustrates the same preferred engine balancing control feedback loop as described in FIG. 18

Figure 20:
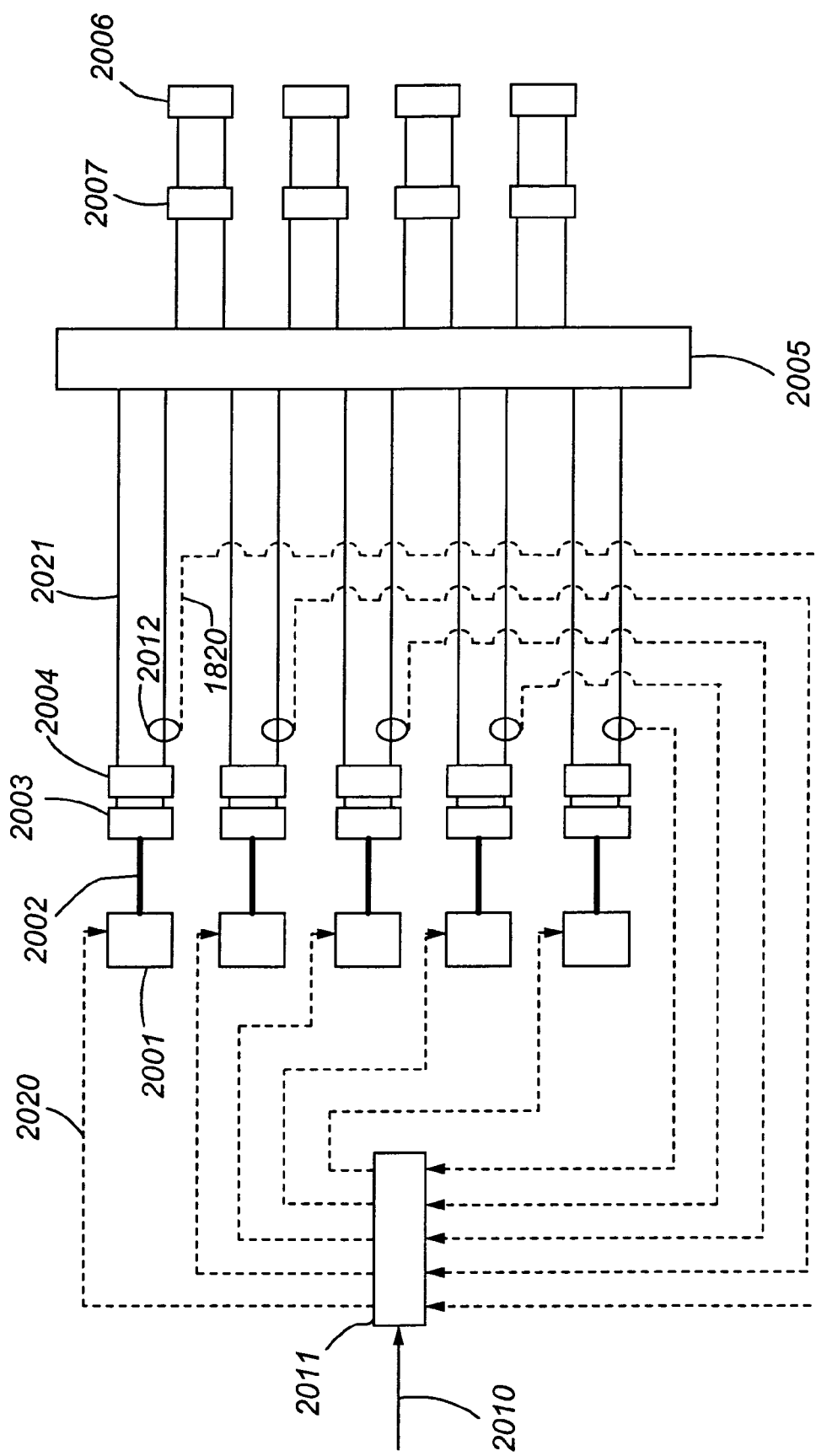
FIG. 20 is a another alternate schematic of a multi-engine current-based control feedback system.

FIG. 20 is a another alternate schematic of a multi-engine current-based control feedback system. This schematic shows five engines 2001, each connected by mechanical shafts 2002 to corresponding alternators 2003. Rectifiers 2004 are electrically connected to the outputs of alternators 2003 to provide DC power to a common DC bus 2005. In this embodiment, the output of the DC bus 2005 provides power to four traction motors 2006, each shown with load control apparatuses 2007. The electrical outputs of the alternator/rectifiers are connected in parallel with the DC bus 2005. The load controlled traction motors are also shown connected in parallel with the DC bus 2005. This figure illustrates a less preferred engine balancing control feedback loop. An input command 2010 (for example a selected power level) is issued to a controller 2011. The output currents from each engines's alternator/rectifier are measured by current sensors 2012 which are monitored by the controller 2011. The controller 2011 then uses the measured currents in a control feedback loop to modify each engine's 2001 speed to bring each engine's power contribution into balance with its pro rata portion of the total power to the DC bus. The control feedback loop is typically one of a number of well-known proportional integral differential ("PID") control algorithms. The dotted lines 2020 represent current feedback control circuit connections while the solid lines 2021 represent power distribution circuit connections. This feedback control configuration is less preferable because (1) it is preferred to maintain the engine speed and power output at its optimum operating mode set point and (2) the mechanical inertia of changing engine speeds tends to make the feedback less responsive.

As can be appreciated, it is possible to use the measured alternator/rectifier currents to adjust or modify a combination of engine speed, engine alternator excitation current and, if available, alternator voltage boost to balance the power outputs of all the engines to the DC bus.

Location-Based Multi-Engine Control

Figure 21:
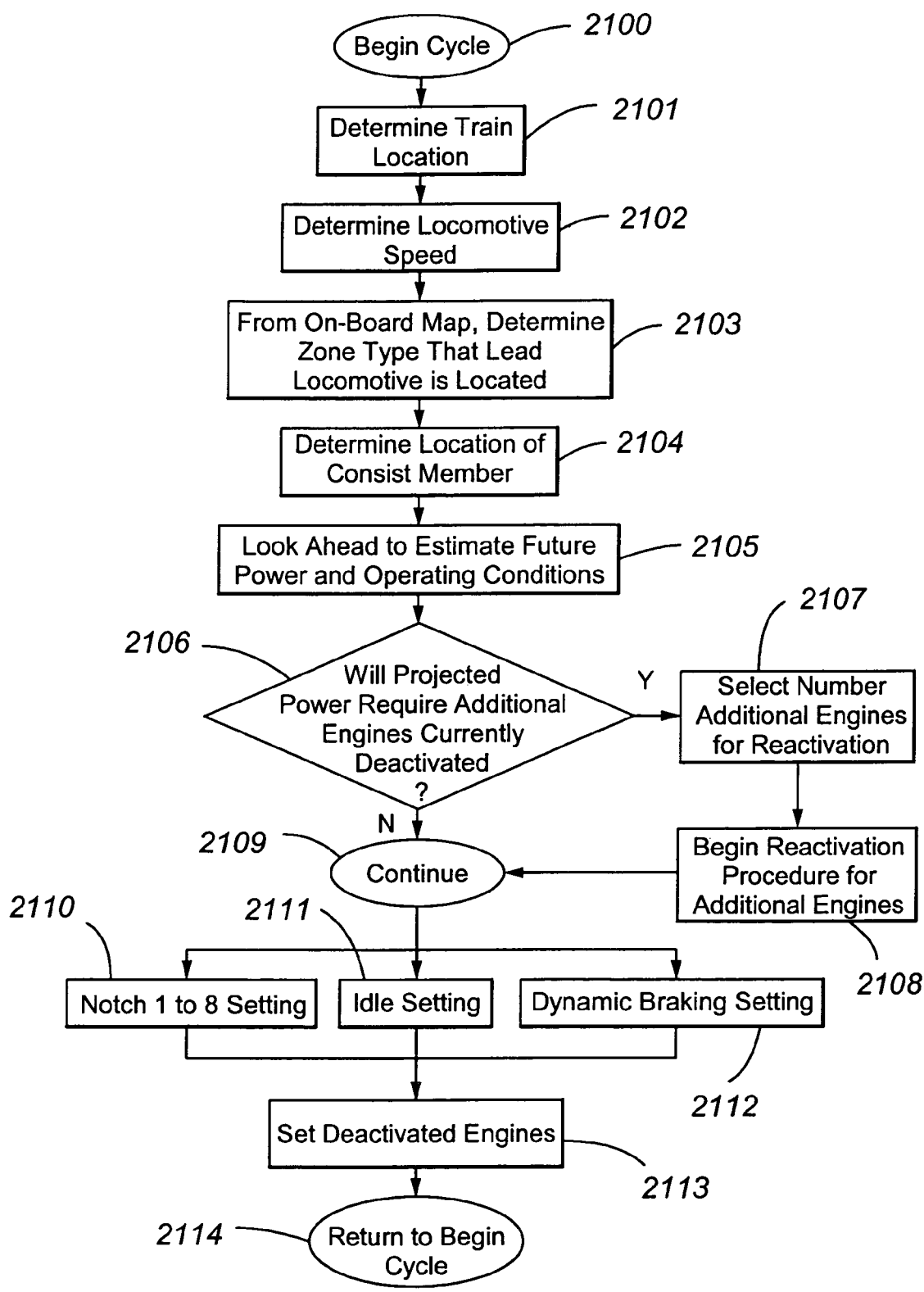
FIG. 21 is another example of a main flow chart of automated decision making for controlling the overall multi-engine selection process.

The following is an example of a more elaborate automated computer-controlled engine operating cycle for a multi-engine locomotive, otherwise it is similar to the basic operating cycle described in FIG. 11. As can be appreciated, many of the steps can be carried out in different sequences and some of the steps may be optional. FIG. 21 illustrates an automated cycle that begins 2100. The first step 2101 in the decision cycle is to determine the train's location along its route at the time in question. This capability can be provided by, for example, a Global Positioning System ("GPS") device, a radio, a cell phone or by a transponder or mechanical locator situated along the track. The next step 2102 in the decision cycle is to determine the speed of the locomotive. For a given notch power setting, this determination allows the tractive effort, traction motor power, traction motor rpms, traction motor back emf, traction motor volts and traction motor current to be computed. If the locomotive is idling and at rest, this step is trivial. The next step 2103 in the decision cycle is to determine the zone that the train is located in along its route. This can be done, for example, by using the train's determined location and an on-board computer containing a detailed physical (2D or 3D as required) map of the train route and route requirements, to determine when the locomotive is in a zone where any of a number of emissions, noise restrictions and speed restrictions must be observed or where certain locomotive performance is required. An example of the latter may be high acceleration such as, for example, exiting a station. The next step 2104 is to determine the location of the locomotive consist member in the train, typically from the train location device in the lead locomotive and from the knowledge of the number of cars that the consist member is removed from the lead locomotive. If there is only one locomotive, this step is trivial. In a long train where consist members may be at various locations, this step is included since consist members can be located in different operating zones. The next step 2105 is to look ahead to project energy, emissions, noise and power requirements of the lead locomotive and all consist members for each section or zone of the train's up and coming route. In step 2106, the requirement for additional engines currently deactivated is established from the data acquired from step 2105. If additional engines are required, then the number of currently deactivated engines that must be activated is determined in step 2107. This engine activation step is described more fully in FIG. 17. The engine activation procedure is implemented in step 1105 and the cycle then continues 2108. The cycle then continues 2109. As noted above, the locomotive operating mode is commonly set by the locomotive's engineer. These are (1) a notch 1 to 8 power setting 2110, (2) an idle setting 2111, or (3) a dynamic braking setting 2112. For each of three power modes, it is possible that one or more engines may be deactivated. Deactivation means idling an engine so that it does not provide power to the DC bus, or shutting off the engine. The deactivation of engines is controlled in step 2113. Step 2114 returns to the beginning of the main control cycle.

Multi-Engine Start-up Method

In general, the rectifier systems such as shown for example in FIG. 2 include blocking diodes to prevent power from flowing back to the engines. However, if the diodes shown for example in FIG. 2 are replaced by IGBTs such as illustrated below in FIG. 22, then, when desired, power can be allowed to flow back to the engines for (1) starting engines that are turned off or (2) using the engines to dissipate braking energy in certain circumstances.

Figure 22:
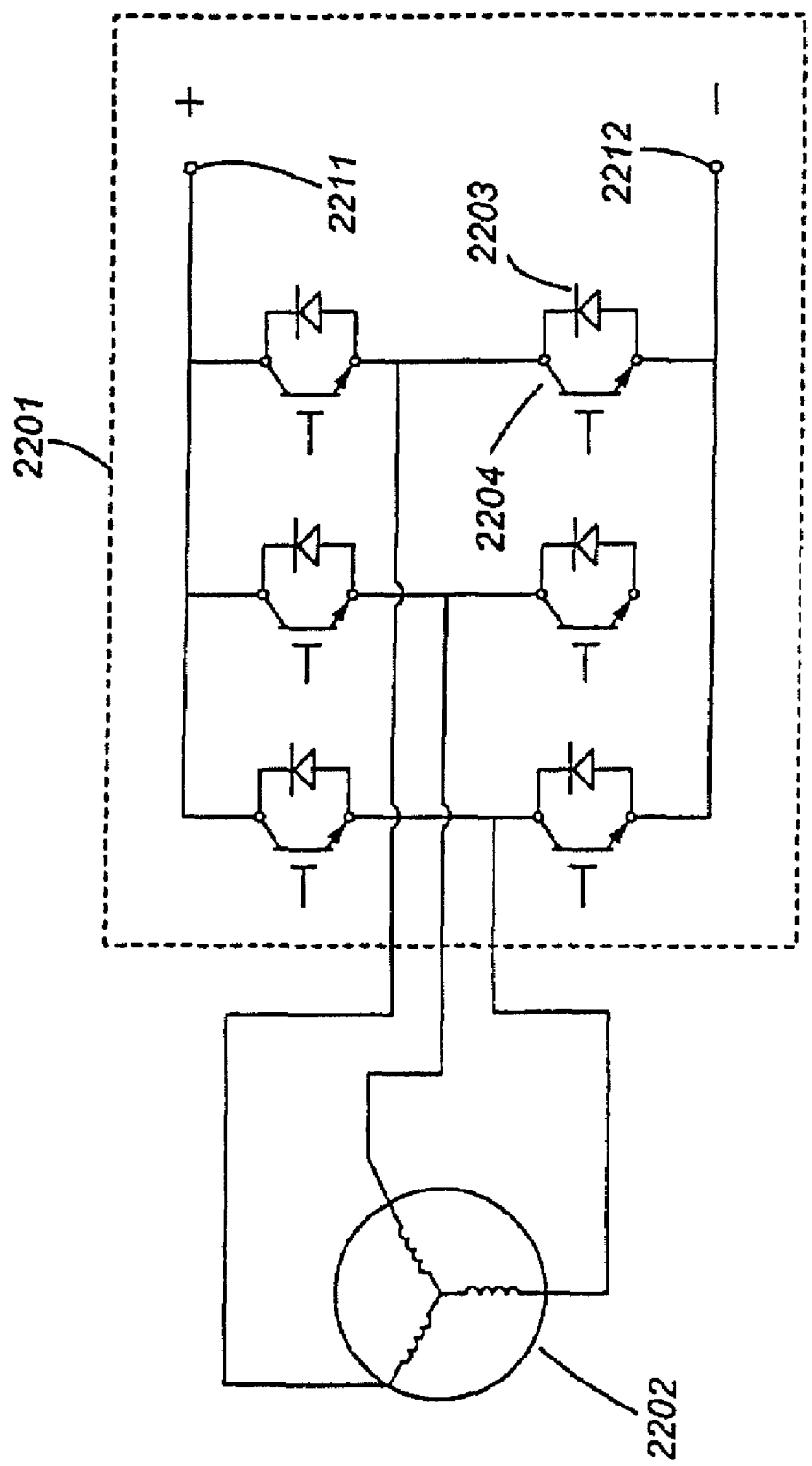
FIG. 22 is a circuit diagram of an inverter for forward or reverse power flow. This is prior art.

FIG. 22 is a circuit diagram of an induction alternator/rectifier for forward or reverse power flow. The circuit described in FIG. 22 is prior art and is a generalization of the rectifying circuit described for example in FIG. 2. In generating mode, a stator 2202 generates an alternating current which is rectified by six power diodes 2204 which are the internal diodes of IGBTs 2203. In generating mode, the six IGBTs 2203 are turned off and their internal diodes 2204 form a rectifying circuit. Power flows from the stator 2201 to the output terminals 2211 and 2212. The output terminals are for example the positive and negative bus bars of a DC bus such as described previously. In motoring mode, DC power from the terminals 2211 and 2212 flows to the stator 2201 which in turn provides shaft power to the rotor (not shown). In motoring mode, the six IGBTs 2203 provide pulse width modulation and form an inverter circuit, providing AC power to the stator. The amount of excitation for an induction generator is controlled by the frequency of the inverter. When the frequency of the inverter is higher than the motor/generator synchronous speed frequency, the motor/generator will produce a positive torque (motoring). When the inverter frequency is lower than the synchronous speed-frequency, the motor/generator will produce a negative torque (generating). Typically, a difference of 3% to 5% between the power frequency being fed the motor/generator and the machine's synchronous speed-frequency will produce full loading for both motoring and generating modes. The use of an induction alternator in motoring mode, when at least one electrical power source (for example, a diesel and its alternator, a turbine and its high-speed alternator, or an energy storage apparatus and its buck/boost circuit) is in operation supplying power to the DC bus, would allow power from the DC bus to be used to start or restart an engine that is turned off. This method of starting engines is known and is used to provide high starting power without the need of a separate starter motor. A pre-lubrication pump can also be operated directly from the DC bus or from an auxiliary power supply to lubricate a diesel engine just prior to starting it so as to extend its operational lifetime. While the above diesel engine start-up procedures are well-known, they can be applied more readily utilizing the voltage control and DC bus architecture of the present invention. In braking mode, the inverter circuit can be controlled to allow power to flow back to the alternator in asynchronous mode so that the alternator will turn the crankshaft of the engine and dissipate energy. Thus, during braking, the engines can be used as additional means of energy dissipation for example when the energy storage system can no longer absorb regenerative energy and/or when the dissipating resistive grid becomes overheated. Alternately, the engines can be used to dissipate excess braking energy in place of a dissipating resistive grid. As can be appreciated, the use of the engine or engines to dissipate braking energy can be used for dynamic braking in a conventional locomotive, replacing the dissipating resistive grid apparatus.

Method Applied to Fuel Cells

The present method of multi-engine control can be readily adapted to a vehicle which is based on fuel cells, rather than on internal combustion engines such as for example diesel engines. As can be appreciated, the locomotive can be comprised of a combination of engines and fuel cells (both of which are prime power sources). A fuel cell power system is commonly comprised of a fuel cell stack and associated equipment such as heat exchangers, blowers, pumps, dehumidifiers and the like. The inputs to the fuel cell are a regulated sources of hydrogen and air. The output of the fuel cell is an unregulated DC voltage and current and emissions consisting principally of water and heat. The output voltage and power of a fuel cell is dependent on, for example, the amount of hydrogen and air, the input pressure and temperature of the hydrogen and air and the output electrical current. The higher the output current, the lower the fuel cell efficiency because of internal fuel cell $I^2R$ resistance losses. Thus a buck/boost circuit or other form of voltage regulation circuit is required to stabilize the voltage from the output of a fuel cell to a DC bus.

As can be appreciated, a fuel cell power system is analogous to a diesel engine power system. A fuel cell power plant is functionally similar to a diesel engine power plant and a voltage regulation circuit is functionally similar to an alternator. When multiple fuel cell systems are used, their respective voltage regulation circuits, such as for example a buck/boost circuits, are controlled to provide the output voltage level of the fuel cell system so as to provide the desired amount of power to a DC bus. Thus the control system for a multi-fuel cell locomotive is based on measuring the output current from the fuel cell system and using a controller to adjust a mechanical parameter of the fuel cell power plant or an electrical parameter of the voltage regulation circuit. Examples of mechanical parameter of the fuel cell power plant are the rate of hydrogen injection, rate of air injection, the pressure of the hydrogen, the pressure of the air and the amount of supercharging used. Examples of electrical parameters of the voltage regulation circuit are the duty cycles of the choppers used to control either the step-up or step-down voltage level.

As with a diesel engine, a fuel cell can be operated in different modes. These would include, for example, a high power mode, an idling mode, a maximum fuel efficiency mode and an optimized lifetime mode. These modes may be specified and applied by specifying an operating point on a fuel cell performance chart such as shown in FIG. 23.

Figure 23:
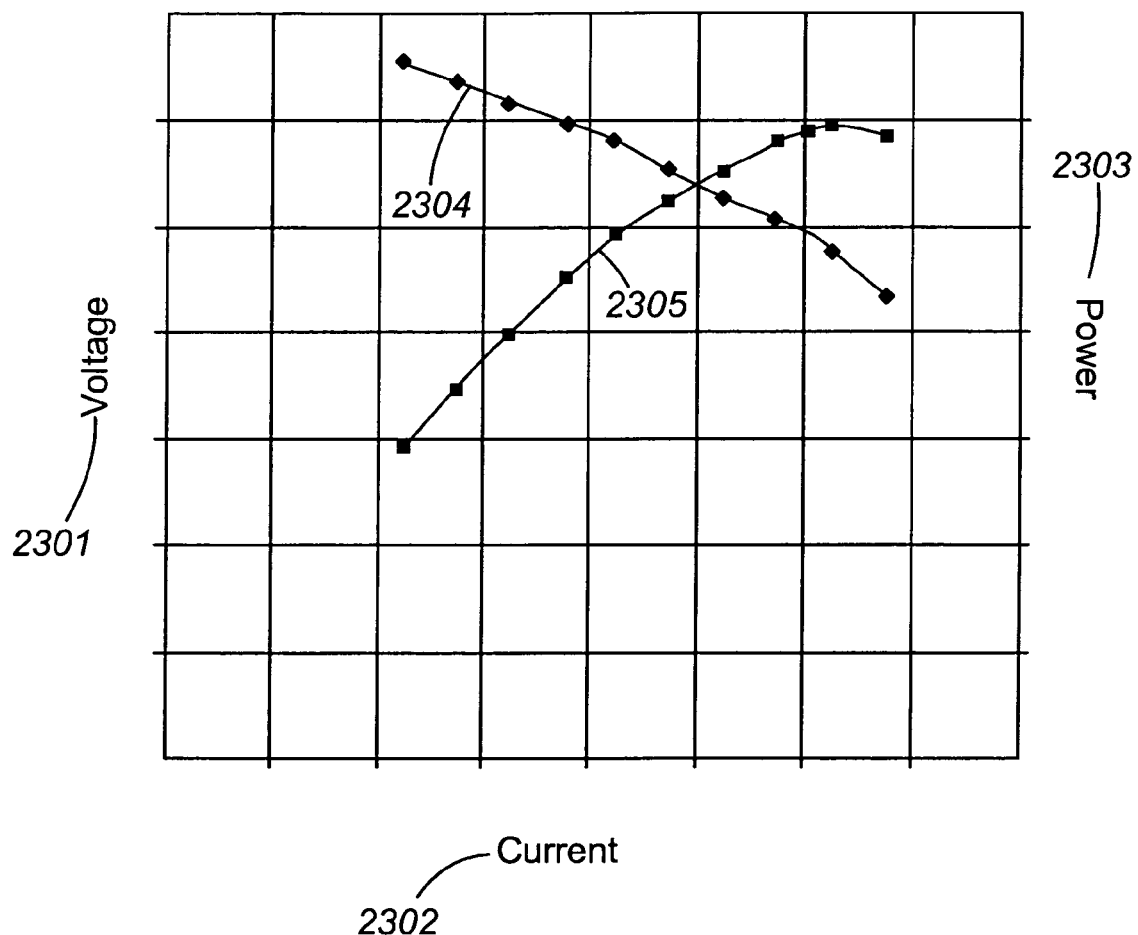
FIG. 23 is a voltage-current diagram for a fuel cell.

FIG. 23 illustrates a typical voltage-current plot for a fuel cell with voltage 2301 on the left-side y-axis and current 2302 on the x-axis. Power 2303 is shown along the right-side y-axis. The volt-ampere curve 2304 illustrates that output voltage drops as output current is increased. The power-ampere curve 2305 shows how power increases to a maximum and then declines with a further increase in output current. As can be seen from FIG. 23, power can be traded off for higher operating efficiency. Fuel cell efficiency is typically high (in the range of about 70% to 80% when current is low) and decreases with increasing output current. The curves shown in FIG. 23 are for a constant fuel injection pressure. Thus a fuel cell efficiency map can be constructed by measuring output voltages and their corresponding output currents for different fuel injection pressures.

The output power range for fuel cell power plants can be in the range of about 50 kW to 1,000 kW and therefore a locomotive power system can be comprised of several internal combustion engines, several fuel cell power plants or a combination of internal combustion engines and fuel cell power plants (typically a total number of prime power systems in the range of 2 to about 10). The general control system for any of these is the same. Measure the current output of each power plant system to a common DC bus operated at a selected voltage. Utilize the measured power (output current times DC bus voltage) power to adjust either or both of a mechanical parameter of the power plant and an electrical parameter of the energy conversion device to obtain the desired power output in the desired operating mode.

A number of variations and modifications of the invention can be used. As will be appreciated, it would be possible to provide for some features of the invention without providing others. For example, in one alternative embodiment, the various inventive features are applied to vehicles other than locomotives, such as cars, railroad cars, and trucks. The control logic set forth above may be implemented as a logic circuit, software, or as a combination of the two.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A propulsion system, comprising:
   (a) an engine system comprising:
      an engine; and
      an n-phase alternator operable to convert mechanical energy output by the engine into alternating current electrical energy, each phase corresponding to an armature winding;
   (b) at least one traction motor in electrical communication with the alternator;
   (c) a plurality of pairs of first and second rectifier diodes to convert the outputted alternating current electrical energy into direct current electrical energy, each of said plurality of pairs of rectifier diodes being connected to a respective n-armature winding of the alternator, each of said first and second rectifier diodes having an input and an output, the output of the first rectifier diode being connected to the input of the second rectifier diode and to the respective n-armature winding of the alternator; and
   (d) a voltage boost circuit electrically connected with each of the n-armature windings of the alternator to boost an output voltage associated with each armature winding, wherein each armature winding provides an inductance for the voltage boost circuit, the voltage boost circuit comprising:
      a single switch having an input and an output, the output of the switch being connected to the inputs of the plurality of first rectifier diodes;
      a plurality of power diodes connected in parallel to the switch, each of said plurality of power diodes having an input and an output, the input of each of said plurality of power diodes being connected to a respective output of the first rectifier diode of the plurality of pairs of rectifier diodes, the output of each of said plurality of power diodes being connected in parallel to input of the switch; and
      a capacitor connected in parallel to the plurality of pairs of first and second rectifier diodes.

2. The propulsion system of claim 1, wherein the single switch is an IGBT switch and further comprising: a control system operable, based on a measured mechanical or electrical parameter of the alternator, to control a switching rate of the IGBT switch such that the IGBT switch, the capacitor, and the diodes form a variable voltage boost circuit with each of the n-armature windings of the alternator during the corresponding power phase of the nth armature winding, whereby the output voltage of the engine system can be varied independently of engine speed.

3. The system of claim 1, wherein the switch, in a first mode, is conducting and, in a second mode, is nonconducting and rectifies the electrical energy.

4. The system of claim 1, wherein the voltage boost circuit does not boost the voltage when a revolutions-per-minute of the engine is greater than a first threshold and boosts the voltage when the revolutions-per-minute of the engine is less than the first threshold.

5. A propulsion method, comprising the steps of:
   (a) providing a propulsion system, comprising:

(i) an engine system comprising:
   an engine; and
      an n-phase alternator operable to convert mechanical energy output by the engine into alternating current electrical energy, each phase corresponding to an armature winding;
(ii) at least one traction motor in electrical communication with the alternator;
(iii) a plurality of pairs of first and second rectifier diodes to convert the outputted alternating current electrical energy into direct current electrical energy, each of said plurality of pairs of rectifier diodes being connected to a respective n-armature winding of the alternator, each of said first and second rectifier diodes having an input and an output, the output of the first rectifier diode being connected to the input of the second rectifier diode and to the respective n-armature winding of the alternator; and
(iv) a voltage boost circuit electrically connected with each of the n-armature windings of the alternator to boost an output voltage associated with each armature winding, wherein each armature winding provides an inductance for the voltage boost circuit, the voltage boost circuit comprising:
   a single switch having an input and an output, the output of the switch being connected to the inputs of the plurality of first rectifier diodes;
   a plurality of power diodes connected in parallel to the switch, each of said plurality of power diodes having an input and an output, the input of each of said plurality of power diodes being connected to a respective output of the first rectifier diode of the plurality of pairs of rectifier diodes, the output of each of said plurality of power diodes being connected in parallel to input of the switch; and
   a capacitor connected in parallel to the plurality of pairs of first and second rectifier diodes;

(b) in a first mode in which the switch is conducting, directing the outputted electrical current of the n-phase alternator along a first path through the power diodes, through the switch, and back to a selected one of the armature windings of the alternator, thereby storing electrical energy in the selected armature winding; and (c) in a second mode in which the switch is nonconducting, directing the output electrical current along a second path through the rectifier diodes to a load, wherein the second path bypasses the switch.

6. The method of claim 5, wherein each armature winding is in the first mode at a different time, wherein a control system, based on a measured mechanical or electrical parameter of the alternator, controls the on-off duty cycle of the switch between the first and second modes such that the switch, the capacitor, and the power diodes form a variable voltage boost circuit with each of the n-armature windings of the alternator during the corresponding first mode of the nth armature winding, whereby the output voltage of the engine system can be varied independently of engine speed.

7. The method of claim 5, wherein in the first mode the current flows through the capacitor in a first direction and in the second mode the current flows through the capacitor in an opposing second direction.

8. In a multi-engine vehicle, a propulsion method, comprising the steps of:
(a) determining an operating voltage range for a direct current electrical bus;
(b) determining a power requirement to be provided to the direct current electrical bus by a plurality of engines;
(c) selecting at least a subset of the engines systems to provide the determined power requirement to the direct current electrical bus;
(d) determining a first magnitude of an operational parameter for each of the selected engine systems to provide, to the direct current electrical bus, the selected engine's portion of the determined power requirement;
(e) setting each of the selected engine systems to the corresponding first magnitude of the determined operational parameter to provide the selected engine system's portion of the determined power requirement to the direct current electrical bus;
(f) measuring an electrical parameter of each of the selected engine systems;
(g) comparing the measured electrical parameter of each of the selected engine systems to the corresponding portion of the determined power requirement; and
(h) if needed, adjusting at least one of (i) the first magnitude of the operational parameter of the selected engine system and (ii) the electrical parameter of the selected engine system to produce the corresponding required electrical power output for the selected engine system, wherein at least one of the selected engine systems comprises:
(i) an n-phase alternator operable to convert mechanical energy output by the engine system into alternating current electrical energy, each phase corresponding to an armature winding;
(ii) at least one traction motor in electrical communication with the alternator;
(iii) a plurality of pairs of first and second rectifier diodes to convert the outputted alternating current electrical energy into direct current electrical energy, each of said plurality of pairs of rectifier diodes being connected to a respective n-armature winding of the alternator, each of said first and second rectifier diodes having an input and an output, the output of the first rectifier diode being connected to the input of the second rectifier diode and to the respective n-armature winding of the alternator; and
(iv) a voltage boost circuit electrically connected with each of the n-armature windings of the alternator to boost an output voltage associated with each armature winding, wherein each armature winding provides an inductance for the voltage boost circuit, the voltage boost circuit comprising:
   a single switch having an input and an output, the output of the switch being connected to the inputs of the plurality of first rectifier diodes;
   a plurality of power diodes connected in parallel to the switch, each of said plurality of power diodes having an input and an output, the input of each of said plurality of power diodes being connected to a respective output of the first rectifier diode of the plurality of pairs of rectifier diodes, the output of each of said plurality of power diodes being connected in parallel to input of the switch; and
   a capacitor connected in parallel to the plurality of pairs of first and second rectifier diodes.

9. The method of claim 8, wherein in the setting step (e), the electrical parameter is set and wherein the electrical parameter is at least one of an output electrical voltage, an output electrical current and output electrical power.

10. A propulsion system, comprising:
(a) a plurality of prime power systems, each prime power system comprising; a prime power source device; and an energy conversion device operable to convert energy output by the prime power device into direct current electrical energy, wherein the prime power system is an engine and the energy conversion device is a mechanical-to-electrical energy conversion device operable to convert mechanical energy output by the engine into direct current electrical energy;

(b) a direct current bus connecting the plurality of prime power systems, the direct current bus being operable to carry the direct current electrical energy to and/or from the prime power systems;

(c) a voltage sensor for measuring a voltage level across the direct current bus;

(d) a plurality of current sensors, each current sensor measuring a direct current electrical energy outputted by a selected prime power system; and (e) a control system operable, based on the measured voltage level across the direct current bus and the respective measured direct current electrical energy into and/or out of each prime power system, to control an electrical parameter of the selected prime power system, wherein the electrical parameter is at least one of an output electrical voltage, an output electrical current, and output electrical power; and wherein the selected prime power system comprises:

(i) an n-phase alternator operable to convert mechanical energy output by the selected prime power system into alternating current electrical energy, each phase corresponding to an armature winding;

(ii) at least one traction motor in electrical communication with the alternator;

(iii) a plurality of pairs of first and second rectifier diodes to convert the outputted alternating current electrical energy into direct current electrical energy, each of said plurality of pairs of rectifier diodes being connected to a respective n-armature winding of the alternator, each of said first and second rectifier diodes having an input and an output, the output of the first rectifier diode being connected to the input of the second rectifier diode and to the respective n-armature winding of the alternator; and (iv) a voltage boost circuit electrically connected with each of the n-armature windings of the alternator to boost an output voltage associated with each armature winding, wherein each armature winding provides an inductance for the voltage boost circuit, the voltage boost circuit comprising:

a single switch having an input and an output, the output of the switch being connected to the inputs of the plurality of first rectifier diodes;

a plurality of power diodes connected in parallel to the switch, each of said plurality of power diodes having an input and an output, the input of each of said plurality of power diodes being connected to a respective output of the first rectifier diode of the plurality of pairs of rectifier diodes, the output of each of said plurality of power diodes being connected in parallel to input of the switch; and a capacitor connected in parallel to the plurality of pairs of first and second rectifier diodes.

* * * * *